United States Patent [19]

Yamazaki

[11] Patent Number: 5,798,842
[45] Date of Patent: Aug. 25, 1998

[54] IMAGE PROCESSING APPARATUS FOR SUBJECTING A COLOR IMAGE TO DESIRED GRADATION PROCESSING

[75] Inventor: Yoshirou Yamazaki, Kanagawa-ken, Japan

[73] Assignee: Fuji Photo Film Co., Ltd., Kanagawa-ken, Japan

[21] Appl. No.: 734,448

[22] Filed: Oct. 18, 1996

[30] Foreign Application Priority Data

Oct. 19, 1995 [JP] Japan ................................ 7-271445

[51] Int. Cl.$^6$ .................... H04N 1/23; H04N 1/40; H04N 1/46; G03B 27/32
[52] U.S. Cl. .................... 358/302; 358/298; 358/538; 355/77
[58] Field of Search .................... 358/296, 298, 358/302, 448, 453, 501, 538; 355/38, 77

[56] References Cited

U.S. PATENT DOCUMENTS

| | | | |
|---|---|---|---|
| 5,309,228 | 5/1994 | Nakamura | 358/500 |
| 5,463,470 | 10/1995 | Terashita et al. | 358/298 |
| 5,561,494 | 10/1996 | Terashita | 355/38 |
| 5,629,752 | 5/1997 | Kinjo | 355/77 X |

Primary Examiner—Eric Frahm

[57] ABSTRACT

An image processing apparatus includes a K histogram calculating device for calculating a histogram of the density of a color image, after conversion to a monochrome image, and for converting it to a digital signal. Further, the apparatus includes a first reference density level calculating device for calculating a first reference density level corresponding to the density of white regions of the color image; a second reference density level calculating device for calculating a second higher reference density level; a third reference density level calculating device for calculating a third reference density level corresponding to the density of black regions of the color image; and a fourth reference density level calculating device for calculating, based on the second and third reference density levels, a fourth reference density level corresponding to an intermediate density of the color image. A density level conversion value calculating device then calculates, based on the calculated histogram, the ratio of image data having a density level corresponding to the density of black regions of the color image to all image data and calculates, based on the calculated ratio and the third reference density level, a third and a fourth reference density level conversion value. Finally, a gradation conversion executing device converts the gradation of the color image, based on the calculated conversion values and predefined first and second reference density level conversion values.

5 Claims, 19 Drawing Sheets

IMAGE PROCESSING APPARATUS FOR SUBJECTING A COLOR IMAGE TO DESIRED GRADATION PROCESSING

BACKGROUND OF THE INVENTION

The present invention relates to an image processing apparatus and, particularly, to such an apparatus for a color image reproducing system which photoelectrically reads out a color image, converts the read-out color image into digital image data, stores the digital image data in image data memory carries out image processing on the stored image data and reproduces the color image.

DESCRIPTION OF THE PRIOR ART

The prior art includes a color image reproducing system which uses a CCD (charge-coupled device) or other such photoelectric conversion element to photoelectrically read a color image recorded on a negative film, reversal film, color print or the like. It converts the so-obtain color image data into a digital signal to obtain image 7 data and stores the image data in a frame memory or other such image data 7 memory. It then subjects the image data stored in the image data memory to image processing and reproduces the color image on a recording material such as color photographic paper or on a CRT (cathode ray tube) or other such display.

Since this color image reproducing system carries out image processing on the image data, it can reproduce a color image with the desired color and gradation even when the color image was recorded on the negative film, reversal film, color print or the like under inappropriate imaging conditions such as underexposure or overexposure. In addition, it can reproduce a color image recorded on negative film, reversal film, color print or the like as a color image having a desired different tone and gradation.

The image processing apparatus used in this type of color image reproducing system preferably enables image data obtained by reading a color image to be automatically subjected to desired gradation processing in accordance with the gradation of the color image.

SUMMARY OF THE INVENTION

It is therefore an object of the present invention to provide an improved image processing apparatus for a color image reproducing system which photoelectrically reads out a color image, converts the read-out color image into digital image data, stores the digital an image data in image data memory, carries out image processing on the image data stored in the image data memory and reproduces the color image. Specifically if provides an image processing apparatus for such a color image reproducing system which enables image data obtained by reading a color image recorded on reversal film to be automatically subjected to desired gradation processing in accordance with the gradation of the color image.

The above and other objects of the present invention can be accomplished by an image processing apparatus for a color image reproducing system which photoelectrically reads out a color image, converts the read-out color image into a digital signal, stores the so-obtained digital image data in an image data memory, carries out image processing on the image data stored in the image data memory and reproduces the color image. The image processing apparatus comprises K histogram calculating means for calculating a histogram of the density of a color image recorded on reversal film when converted to a monochrome image, first reference density level calculating means for calculating a first reference density level corresponding to the density of white regions of the color image, second reference density level calculating means for calculating a second reference density level which corresponds to the density of white regions of the color image and what is relatively higher than the first reference density level, third reference density level calculating means for calculating a third reference density level corresponding to the density of black regions of the color image, fourth reference density level calculating means for calculating, based on the second reference density level and the third reference density level, a fourth reference density level corresponding to an intermediate density of the color image, density level conversion value calculating means for calculating, based on the histogram calculated by the K histogram calculating means, the ratio of image data having a density level corresponding to the density of black regions of the color image to all image data of the color image and for calculating, based on the calculated ratio and the third reference density level, a third reference density level conversion value and a fourth reference density level conversion value, and gradation conversion executing means for converting the gradation of the color image based on the conversion values calculated by the density level conversion value calculating means and predefined first reference density level and second reference density level conversion values.

In a preferred aspect of the present invention, the density level conversion value calculating means calculates, based on the histogram calculated by the K histogram calculating means, the ratio of pixels having the third reference density level calculated by the third reference density level calculating means to all pixels of the color image and calculates, based on the calculated ratio and the third reference density level, the third reference density level conversion value and the fourth reference density level conversion value.

In another preferred aspect of the invention, the image processing apparatus further comprises R density histogram calculating means for calculating an R density histogram corresponding to the R density of the color image, G density histogram calculating means for calculating a G density histogram corresponding to the G density of the color image and B density histogram calculating means for calculating a B density histogram corresponding to the B density of the color image. Further and the first reference density level calculating means, the second reference density level calculating means and the third reference density level calculating means respectively calculate, based on the histogram calculated by the K histogram calculating means, monochrome density levels at which the numbers of pixels become x%, y% and z% of all pixels; respectively calculate based on the R density histogram, the G density histogram and the B density histogram, the corresponding R density level, G density level and B density level, correct the monochrome density levels in accordance with the absolute value of the differences between the first reference density level, the second reference density level and the third reference density level and each of the corresponding R density level, G density level and B density level; and respectively calculate the first reference density level, the second reference density level and the third reference density level.

The above and other objects of the present invention can further be accomplished by an image processing apparatus for a color image reproducing system which photoelectrically reads out a color image, converts the read-out color image into a digital signal, stores the so-obtained digital image data in an image data memory, carries out image processing on the image data stored in the image data memory and reproduces the color image. The image processing apparatus comprises K histogram calculating means for calculating a histogram of the density of a color image recorded on reversal film when converted to a monochrome image, R density histogram calculating means for calculating an R density histogram corresponding to the R density of the color image, G density histogram calculating means for calculating a G density histogram corresponding to the G density of the color image, B density histogram calculating means for calculating a B density histogram corresponding to the B density of the color image, first reference density level calculating means for calculating a first reference density level corresponding to the density of white regions of the color image, second reference density level calculating means for calculating a second reference density level which corresponds to the density of white regions of the color image and which is relatively higher than the first reference density level, third reference density level calculating means for calculating a third reference density level corresponding to the density of black regions of the color image, fourth reference density level calculating means for calculating, based on the second reference density level and the third reference density level, a fourth reference density level corresponding to an intermediate density of the color image, first region determining means for determining first regions whose density level is at or below a first prescribed density level relatively higher than the first reference density level and whose color saturation level is at or below a first prescribed color saturation level, second region determining means for determining second regions whose density level is at or above a second prescribed density level lower than the second reference density level and at or below a third prescribed density level relatively higher than the second reference density level and whose color saturation level is at or below a second prescribed color saturation level, third region determining means for determining third regions whose density level is at or above a fourth prescribed density level lower than the third reference density level and whose color saturation level is below a third prescribed color saturation level, density level conversion value calculating means for conducting calculations based on the average value of the ratios of the R, G, B density level components corresponding to the density level of the pixels in the first regions determined by the first region determining means and the first reference density level calculated by the first reference density level calculating means to determine individual reference values for the R, G, B density level components of the first reference density level, conducting calculations based on the average value of the ratios of the R, G, B density level components corresponding the density level of the pixels in the second regions determined by the second region determining means and the second reference density level calculated by the second reference density level calculating means to determine individual reference values for the R, G, B density level components of the second reference density level, conducting calculations based on the average value of the ratios of the R, G, B density level components corresponding to the density level of the pixels in third regions determined by the third region determining means and the third reference density level calculated by third reference density level calculating means to determine individual reference values for the R, G, B density level components of the third reference density level and conducting calculations based on the individual reference values for the R, G, B density level components of the second reference density level and the individual reference values for the R, G, B density level components of the third reference density level to determine individual reference values for the R, G, B density level components of the fourth reference density level, and density gradation conversion executing means for converting the gradation of the color image based on the conversion values calculated by the density level conversion value calculating means.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
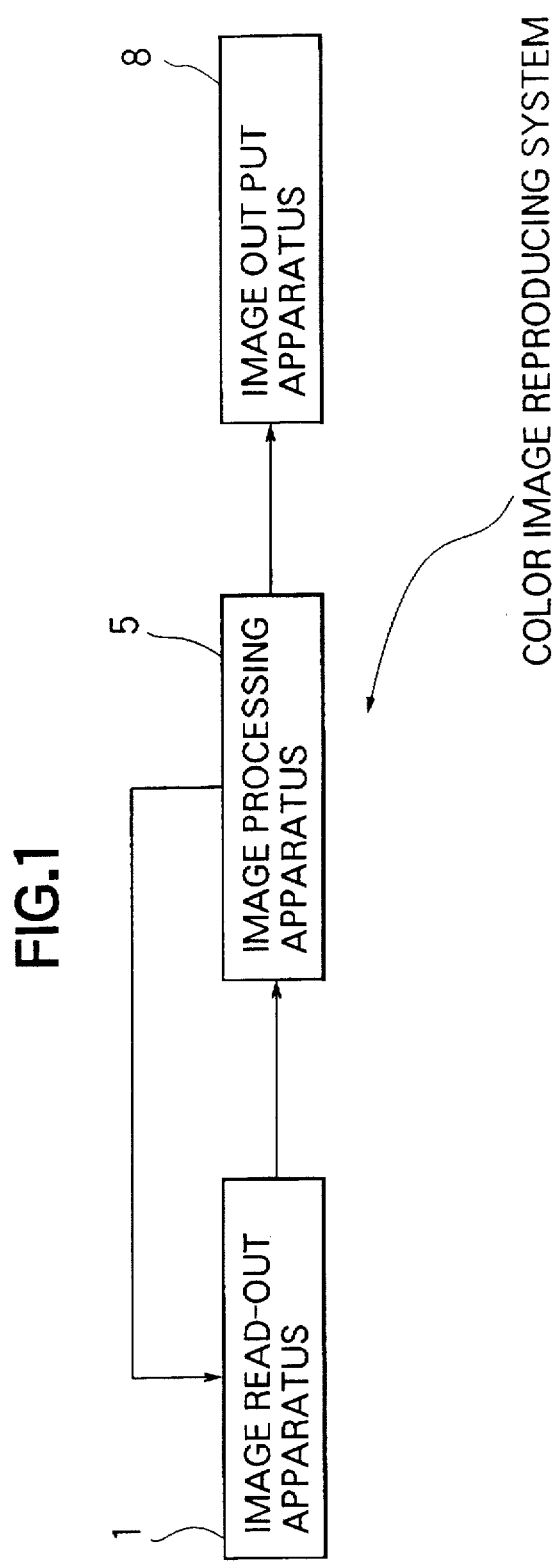
FIG. 1 is a block diagram of a color image reproducing system including an image processing apparatus which is a preferred embodiment of the invention.
Figure 2:
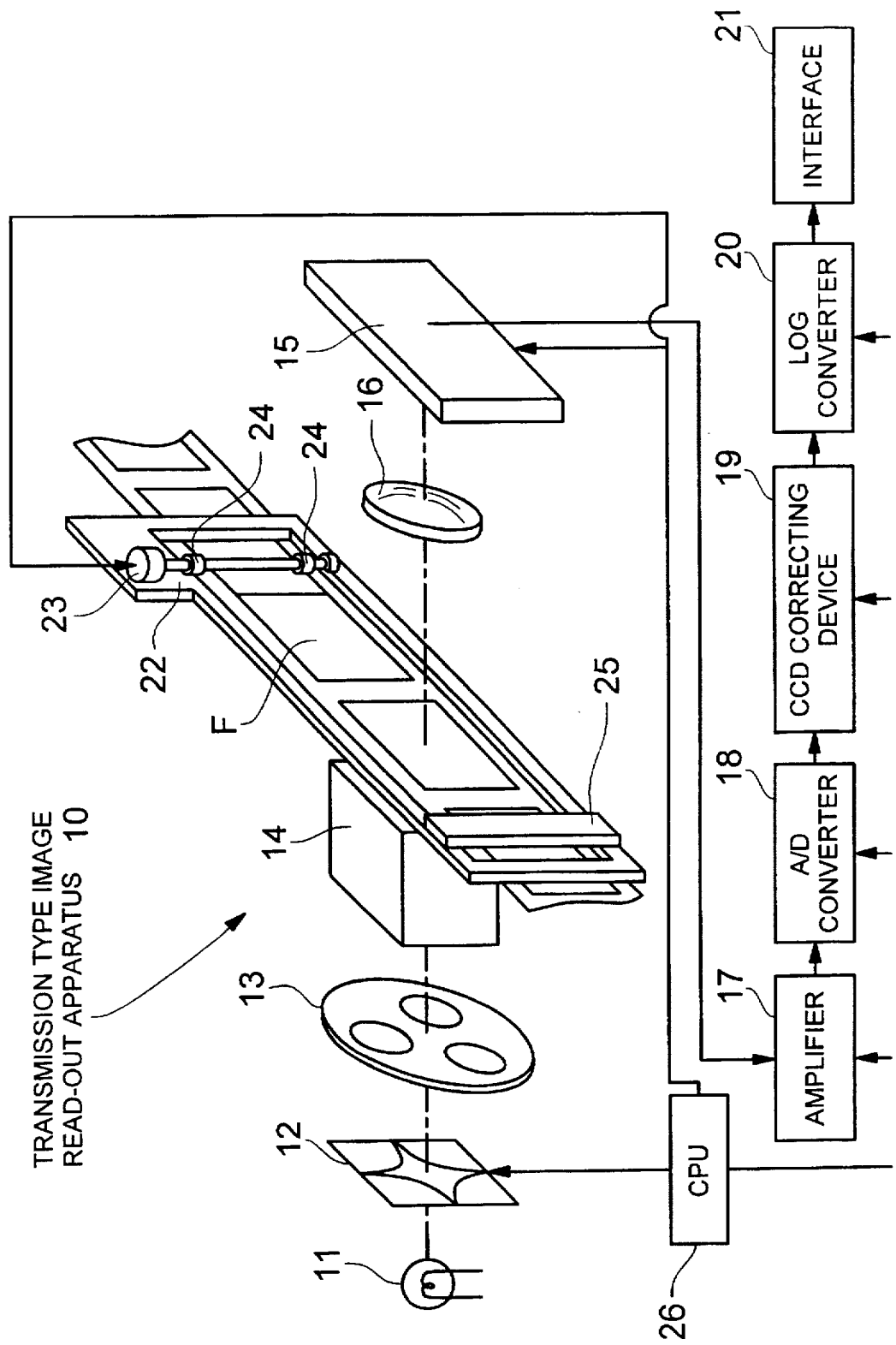
FIG. 2 is a schematic view of a transmission type image read-out apparatus for a color image reproducing system, which produces image data to be processed by an image processing apparatus which is an embodiment of the invention.
Figure 3:
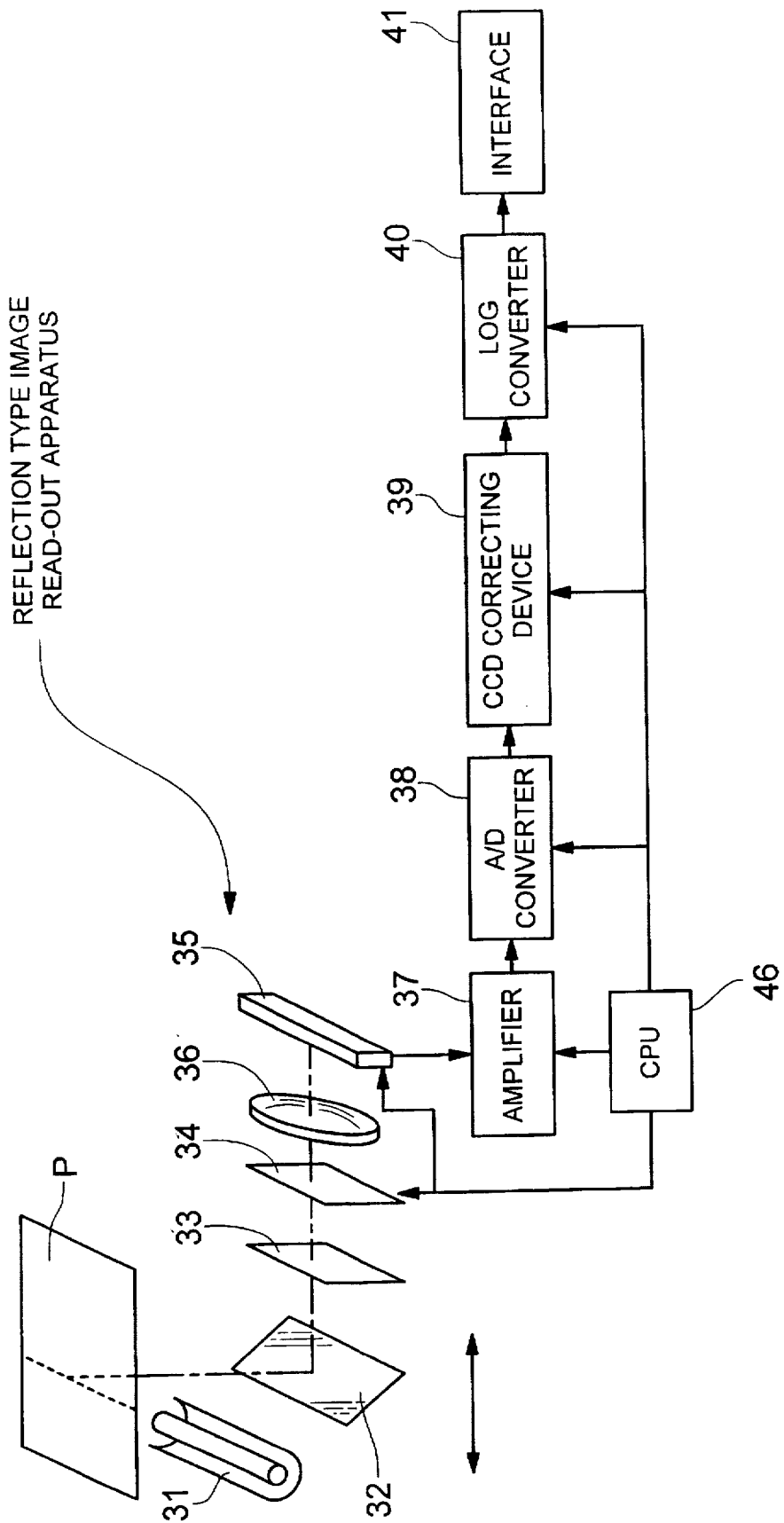
FIG. 3 is a schematic view of a reflection type image read-out apparatus for a color image reproducing system, which produces image data to be processed by an image processing apparatus which is a preferred embodiment of the invention.

As shown in FIG. 1, a color image reproducing system comprises an image read-out apparatus 1 for reading a color image and generating digitized image data, an image processing apparatus 5 for carrying out prescribed image processing on the image data generated by the image read-out apparatus 1 and an image output apparatus 8 for reproducing a color image based on the image data image processed by the image processing apparatus. The color image reproducing system is configured so that either of two types of image read-out apparatuses can be selectively connected with the image processing apparatus 5 as the image read-out apparatus 1, a transmission type image read-out apparatus such as shown in FIG. 2 for photoelectrically reading a color image recorded on a film F such as a negative film or reversal film and a reflection type image read-out apparatus such as shown in FIG. 3 for photoelectrically reading a color image recorded on a color print P. As a result, the color image reproducing system can reproduce both color images recorded on negative, reversal or other such films F and color images recorded on color prints P.

FIG. 2 is a schematic view showing an embodiment of the invention directed to a transmission type image read-out apparatus 10 for a color image reproducing system, which produces image data to be processed by an image processing embodiment the invention.

The transmission type image read-out apparatus 10 is adapted to photoelectrically read a color image by directing light onto a color image recorded on a negative, reversal or other such film F and detecting the light transmitted through the film. It comprises a light source 11, a light regulating unit 12 for regulating the passage of the light emitted by the light source 11, a color separation unit 13 for separating the light emitted by the light source 11 into R (red), G (green) and (B) color components, a diffusing unit 14 for diffusing the light emitted by the light source 11 so that it evenly illuminates the film F, a CCD area sensor 15 for photoelectrically detecting the light transmitted through the film F and a lens 16 for focusing the light transmitted through the film F on the CCD area sensor 15.

The transmission type image read-out apparatus 10 further includes an amplifier 17 for amplifying R, G, B image signals generated by the CCD area sensor 15 based on the photoelectrically detected R, G and B color components, an A/D (analog/digital) converter 18 for digitizing the image signals, CCD correcting device 19 for processing the digitized image signals from the A/D converter 18 to correct for dark current and variance in sensitivity among the individual pixels and a log converter 20 for converting R, G, B image data into density data. The log converter 20 is connected with an interface 21.

The film F is held in a carrier 22. After one frame of the film F held in the carrier 22 has been conveyed to a prescribed position by rollers 24 driven by a motor 23, it is maintained stationary for read-out. When read-out of the color image of the frame has been completed, the next frame is conveyed to the read-out position. Reference numeral 25 in FIG. 2 designates a picture region detection sensor which detects the density distribution of the color images recorded on the film F and outputs a density signal indicative of the detected density to a CPU (central processing unit) 26 for controlling the transmission type image read-out apparatus 10. The CPU 26 uses the density signal to calculate the position of the color image picture region and stops the motor 23 when it discriminates that the color image picture region has reached the prescribed position.

FIG. 3 is a schematic view of a reflection type image read-out apparatus 30 for a color image reproducing system which produces image data to be processed by an image processing apparatus, which is a preferred embodiment of the invention.

The reflection type image read-out apparatus 30 is adapted to photoelectrically read a color image by directing light onto a color image recorded on a color print P and detecting the light reflected by the color print P. In comprises a light source 31, a mirror 32 for reflecting light emitted by the light source 31 and reflected by the surface of the color print P, a color balance filter 33 for adjusting the R, G, B sensitivity of the light reflected by the surface of the color print P, a light regulating unit 34 for regulating the passage of the light reflected by the surface of the color print P, CCD line sensor 35 for photoelectrically detecting the light reflected by the color print P and a lens 36 for focusing the light reflected by the color print P on the CCD line sensor 35. The CCD line sensor 35 is constituted to have three lines corresponding to three (R, G, B) colors. The CCD line sensor 35 reads the color image recorded on the color print P two-dimensionally by detecting light reflected from the color print P while the light source 31 and the mirror 32 are moved in the directions of the double headed arrow.

The reflection type image read-out apparatus 30 includes an amplifier 37 for amplifying R, G, B image signals generated by the CCD area sensor 35 based on the photoelectrically detected R, G and B color components, an A/D converter 38 for digitizing the image signals, CCD correcting device 39 for processing the digitized image signals from the A/D (analog/digital) converter 38 to correct for dark current and variance in sensitivity among the individual pixels and a log converter 40 for converting R, G, B image data into density data. The log converter 40 is connected with an interface 41.

The reflection type image read-out apparatus 30 is equipped with a carrier (not shown) for holding the color print P stationary and drive means (not shown) for conveying the light source 31 and the mirror 32 in the arrow directions.

The reflection type image read-out apparatus 30 is controlled by a CPU 46.

Figure 4:
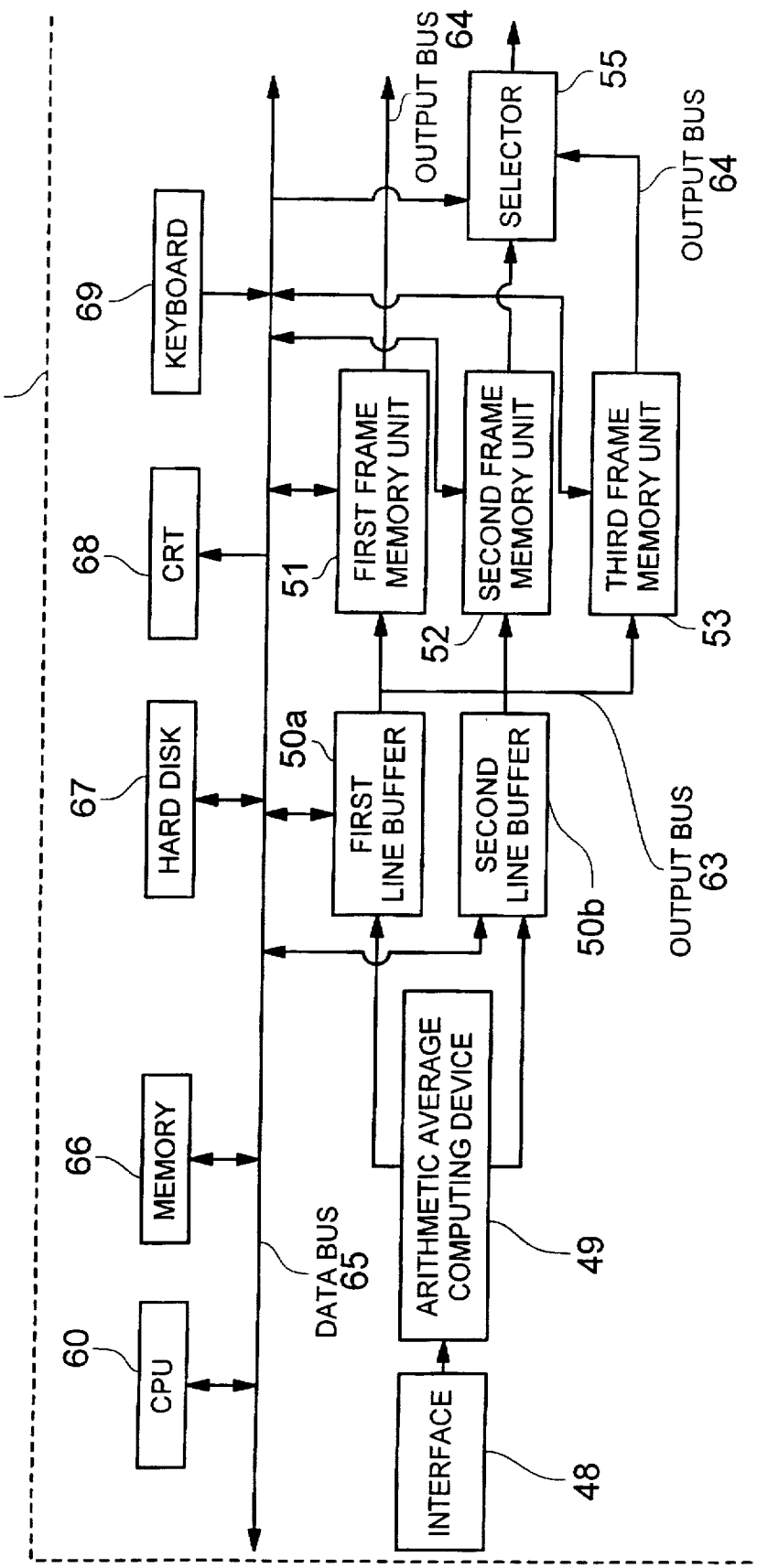
FIG. 4 is a block diagram of part of an image processing apparatus which is a preferred embodiment of the invention, the remainder of which is shown in FIG. 5.
Figure 5:
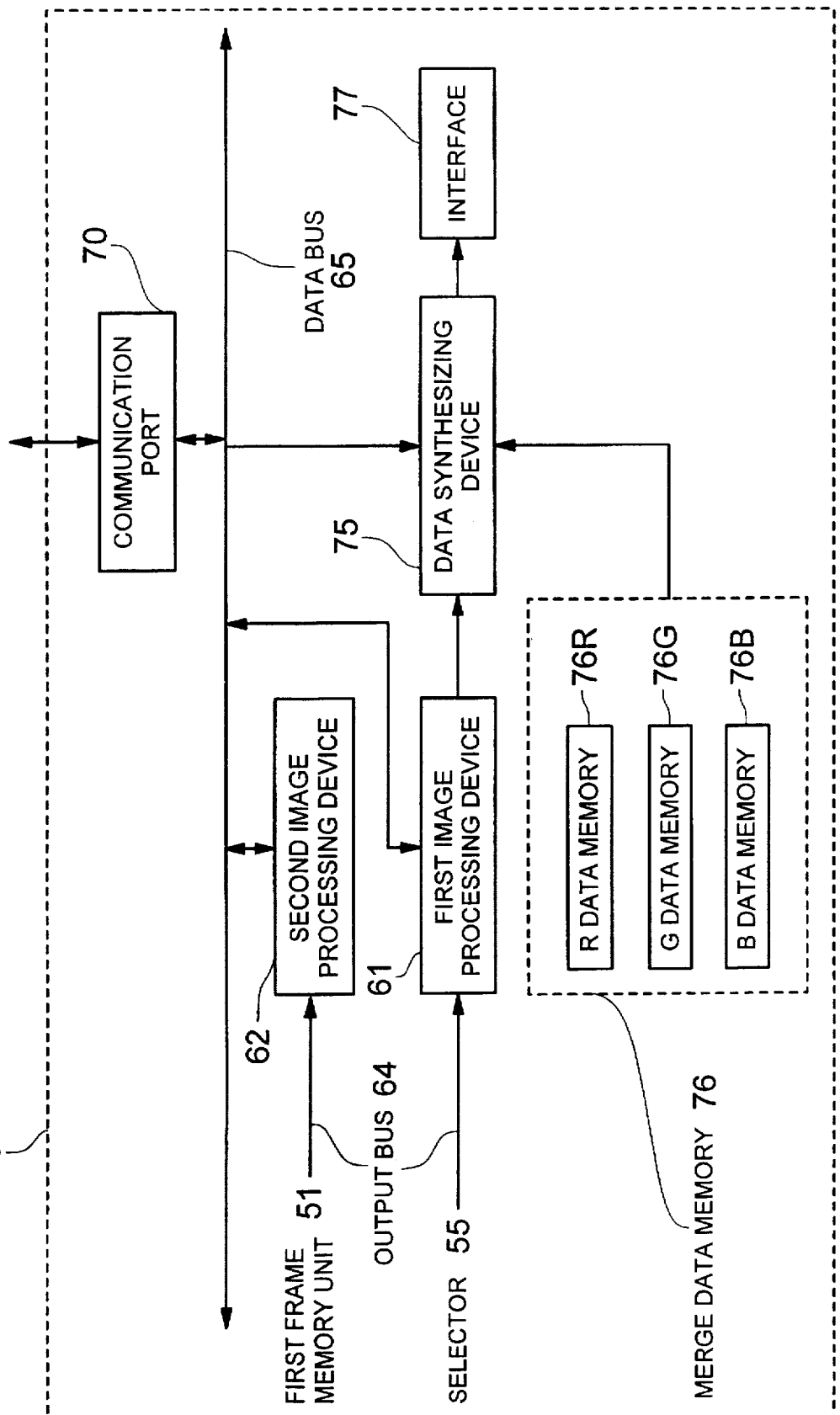
FIG. 5 is a block diagram of part of an image processing apparatus which is a preferred embodiment of the invention, the remainder of which is shown in FIG. 4.

FIGS. 4 and 5 are block diagrams of an image processing apparatus 5, which is a preferred embodiment of the invention.

The image processing apparatus 5 comprises an interface 48 which can be connected to the interface 21 of the transmission type image read-out apparatus 10 or the interface 41 of the reflection type image read-out apparatus 30, arithmetic average computing device 49 for summing and averaging the values of sets of four adjacent pixels of the image data generated and forwarded by the image read-out apparatus 1 line by line and defining the average value as one pixel, a first line buffer 50a and a second line buffer 50b for storing alternate lines of the image data, and a first frame memory unit 51, a second frame memory unit 52 and a third frame memory unit 53 for receiving line data stored in the first line buffers 50a, 50b and storing image data corresponding to a color image recorded in one frame of the film F or in one color print P.

In the present embodiment, the image read-out apparatus 1 conducts a first (preliminary) read-out of the color image recorded in one frame of the film F or in one color print P and the image processing apparatus 5 uses the image data generated based on the preliminary read-out to set the image read-out conditions for a second (main) read-out. The main color image read-out is then conducted to generate the final digital image data. The first frame memory unit 51 stores the image data obtained by the preliminary read-out (the first read-out), while the second frame memory unit 52 and the third frame memory unit 53 store the image data obtained by the main read-out (second read-out).

Figure 6:
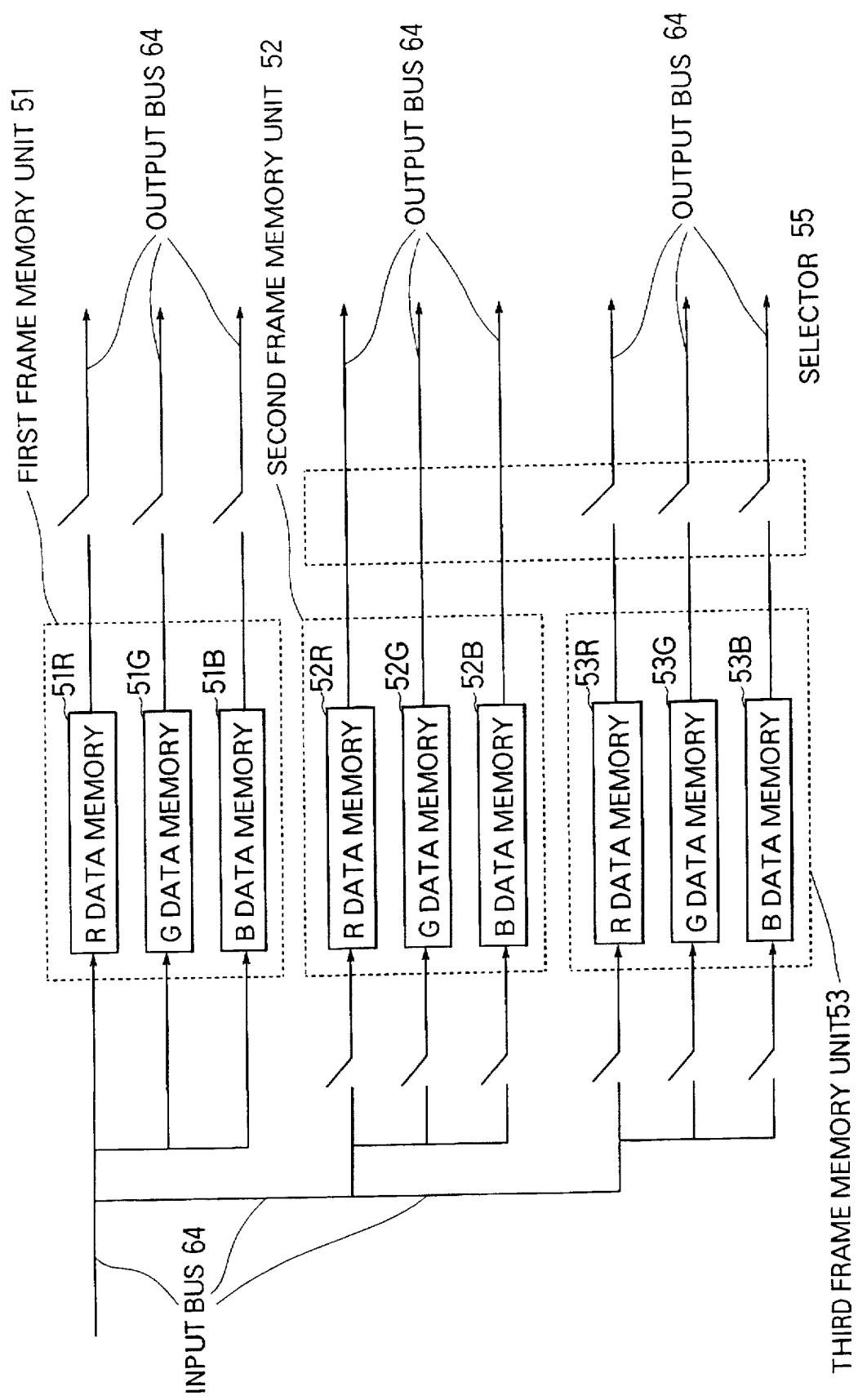
FIG. 6 is a block diagram showing the particulars of the first frame memory unit, second frame memory unit and third frame memory unit of the image processing apparatus of FIGS. 4 and 5.

FIG. 6 is a block diagram showing the particulars of the first frame memory unit 51, second frame memory unit 52 and third frame memory unit 53. For enabling the image processing apparatus 5 to process the image data generated by color image read-out, the first frame memory unit 51, the second frame memory unit 52 and the third frame memory unit 53 are each provided with R, G and B data memories for storing image data corresponding to R (red), G (green) and B (blue) components. Specifically, the first frame memory unit 51 has an R data memory 51R, a G data memory 51G and a B data memory 51B, the second frame memory unit 52 has an R data memory 52R, a G data memory 52G and a B data memory 52B, and the third frame memory unit 53 has an R data memory 53R, a G data memory 53G and B data memory 53B. FIG. 6 shows the state during input of image data obtained by the preliminary read-out to the first frame memory unit 51 and output of the image data stored in the second frame memory unit 52.

The image processing apparatus 5 has a CPU 60 which controls its overall operation. The CPU 60 can communicate with the CPU 26 for controlling the transmission type image read-out apparatus 10 or the CPU 46 for controlling the reflection type image read-out apparatus 30 via communication lines (not shown). It can also communicate via a communication line (not shown) with the CPU of the image output apparatus 8 described later. Based on the image data obtained by the preliminary read-out and stored in the first frame memory unit 51, the CPU 60 can adjust the image read-out conditions for the main read-out of the color image and, if necessary, can also adjust the image processing conditions. Specifically, the CPU 60 decides the read-out conditions for the main read-out based on the image data obtained by the preliminary read-out so as to enable efficient utilization of the dynamic range of the CCD area sensor 15 or the CCD line sensor 35 at the time of the main read-out and outputs a read-out control signal to the CPU 26 of the transmission type image read-out apparatus 10 or the CPU 46 of the reflection type image read-out apparatus 30. Upon receiving the read-out control signal, the CPU 26 of the transmission type image read-out apparatus 10 or the CPU 46 of the reflection type image read-out apparatus 30 controls the quantity of light passage regulated by the light regulating unit 12 or the light regulating unit 34 and further controls the storage time of the CCD area sensor 15 or the CCD line sensor 35. As required, the CPU 60 at the same time outputs to first image processing device and second image processing device (described later) a control signal based on the obtained image data so as to adjust the image processing parameters and other image processing conditions of the first image processing device and the second image processing device to enable reproduction on color photographic paper of a color image having optimum density, gradation and tone.

Since the image data obtained by the preliminary read-out is used solely for deciding the read-out conditions and the image processing conditions for the main read-out, it does not have to be of large volume. As explained in more detail later, moreover, this embodiment of the image processing apparatus enables the operator to reproduce a color image based on the image data obtained by the preliminary read-out on a CRT and to set the image processing conditions while observing the reproduced color image. The image processing apparatus 5 reduces the volume of the image data obtained by the preliminary read-out to a level enabling reproduction of a color image on a CRT and stores the reduced image data in the first frame memory unit 51. To achieve this data reduction, the image read-out apparatus 1 is configured so that the CCD area sensor 15 of the transmission type image read-out apparatus 10 reads only odd fields or even fields of the image data during the preliminary read-out and that the speed of the light source 31 and the mirror 32 of the reflection type image read-out apparatus 30, i.e., the sub-scanning speed, is doubled during the preliminary read-out, thereby reducing the volume of the read-out image data. In addition, the image processing apparatus 5 is configured so that the arithmetic average computing device 49 sums and averages the values of sets of four adjacent pixels of the image data received line by line and defines the average values as single pixels, thereby reducing the number of pixels per line of the image data to ¼. It is further configured so that the lines are stored alternately in the first line buffer 50a and the second line buffer 50b and only the image data stored in one of the two first line buffers 50a, 50b are stored in the first frame memory unit 51. This thereby reduces the number of pixels of the image data obtained by the preliminary read-out to ¹⁄₁₆. Therefore, while the second frame memory unit 52 and the third frame memory unit 53 for storing image data obtained by the main read-out have capacities enabling them to store the image data obtained by read-out of a color image recorded in one frame of the negative, reversal or other such film F or a color image recorded in one color print P, the first frame memory unit 51 for storing the image data obtained by the preliminary read-out has a much smaller capacity than the second frame memory unit 52 and the third frame memory unit 53.

The image processing apparatus 5 is further provided with a first image processing device 61 adapted to enable a color image to be reproduced on color photographic paper with the desired density, gradation and tone by subjecting the image data stored in the second frame memory unit 52 and the third frame memory unit 53 to gradation correction, color conversion, density conversion and other such image processing by use of lookup tables or matrix computation, and a second image processing device 62 adapted to enable a color image to be reproduced on the screen of a CRT (explained later) with the desired picture quality by subjecting the image data stored in the first frame memory unit 51 to gradation correction, color conversion, density conversion and other such image processing by use of lookup tables or matrix computation. A selector 55 selects the output of either the second frame memory unit 52 or the third frame memory unit 53 so as to input the image data stored in one or the other of the second frame memory unit 52 and the third frame memory unit 53 to the first image processing device 61.

The first frame memory unit 51, second frame memory unit 52 and third frame memory unit 53 are connected to an input bus 63 and an output bus 64. The image processing apparatus 5 further has a data bus 65 to which are connected the CPU 60 for overall control of the color image reproducing system, a memory 66 for storing an operating program executed by the CPU 60, a hard disk 67 for storing image data, a CRT 68, a keyboard 69, a communication port 70 for connection with another color image reproducing system via a communication line, and communication lines to the CPU 26 of the transmission type image readout apparatus 10 and the CPU 46 of the reflection type image read-out apparatus 30.

The first image processing device 61 is connected to data synthesizing device 75 and the data synthesizing device 75 is connected with a merge data memory 76. The merge data memory 76 has an R data memory 76R, a G data memory 76G and a B data memory 76B for storing data corresponding to the R (red), G (green) and B (blue) components of graphics, characters or the like. The image data relating to graphics, characters and the like stored in the merge data memory 76 can be synthesized with the image data obtained by reading out a color image recorded on a film F or a color print P, thereby enabling the image output apparatus 8 (explained below) to reproduce a composite color image based on the two types of image data. The data synthesizing device 75 is connected with an interface 77.

Figure 7:
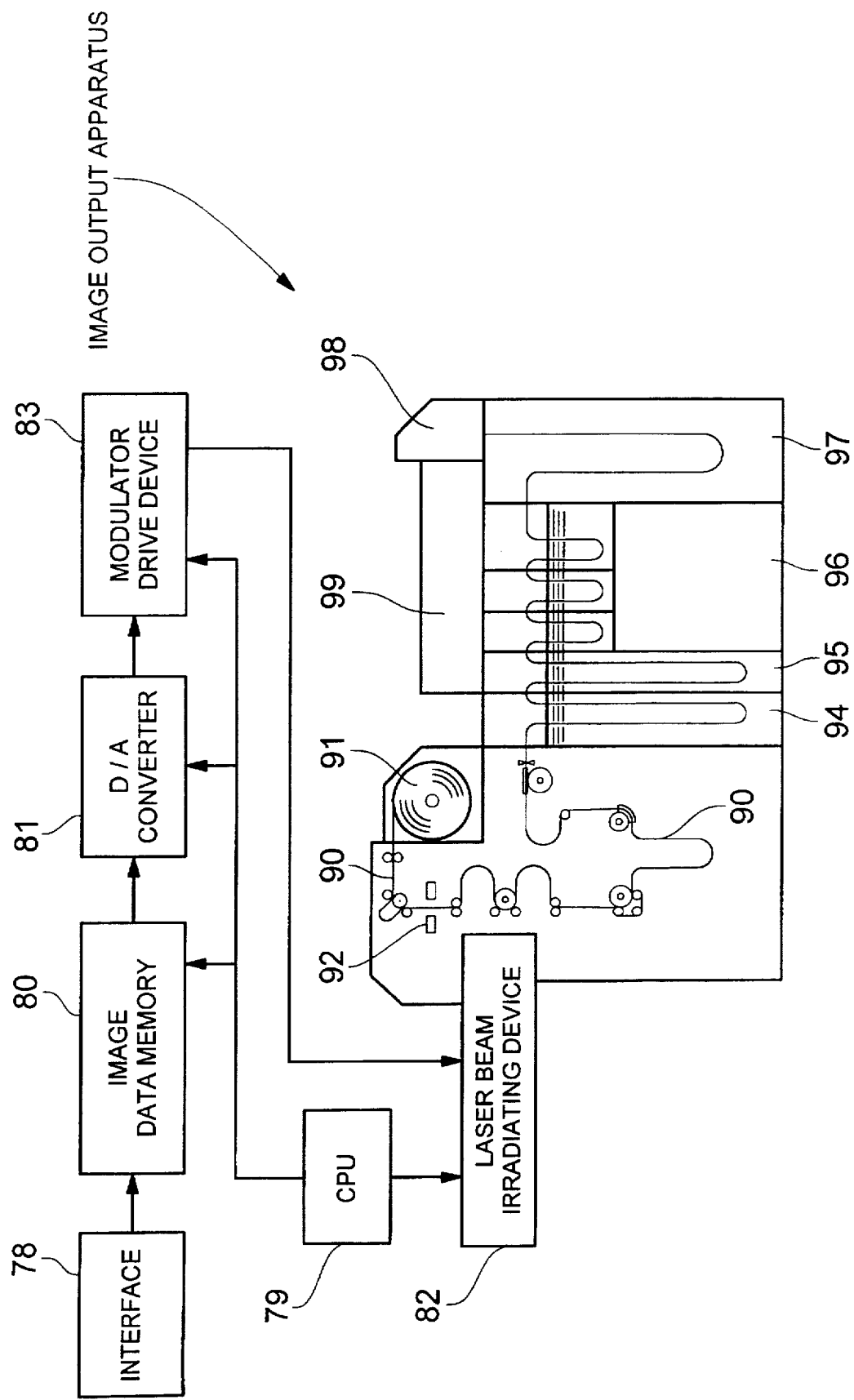
FIG. 7 is a schematic view of an image output apparatus for a color image reproducing system, which reproduces color images on color photographic paper based on image data processed by an image processing apparatus which is a preferred embodiment of the invention.

FIG. 7 is a schematic view of the image output apparatus 8 for a color image reproducing system which reproduces color images on color photographic paper based on image data processed by an image processing apparatus which is a preferred embodiment of the invention.

The image output apparatus 8 includes an interface 78 connectable with the interface 77 of the image processing apparatus 5, a CPU 79 for controlling the image output apparatus 8, an image data memory 80 consisting of multiple frame memories for storing image data input from the image processing apparatus 5, a D/A (digital/analog) converter 81 for converting the image data into an analog signal, laser beam irradiating device 82 and modulator drive device 83 for outputting modulation signals for modulating the intensities of the laser beams produced by the laser beam irradiating device 82. The CPU 79 can communicate with the CPU 60 of the image processing apparatus 5 via a communication line (not shown).

Figure 8:
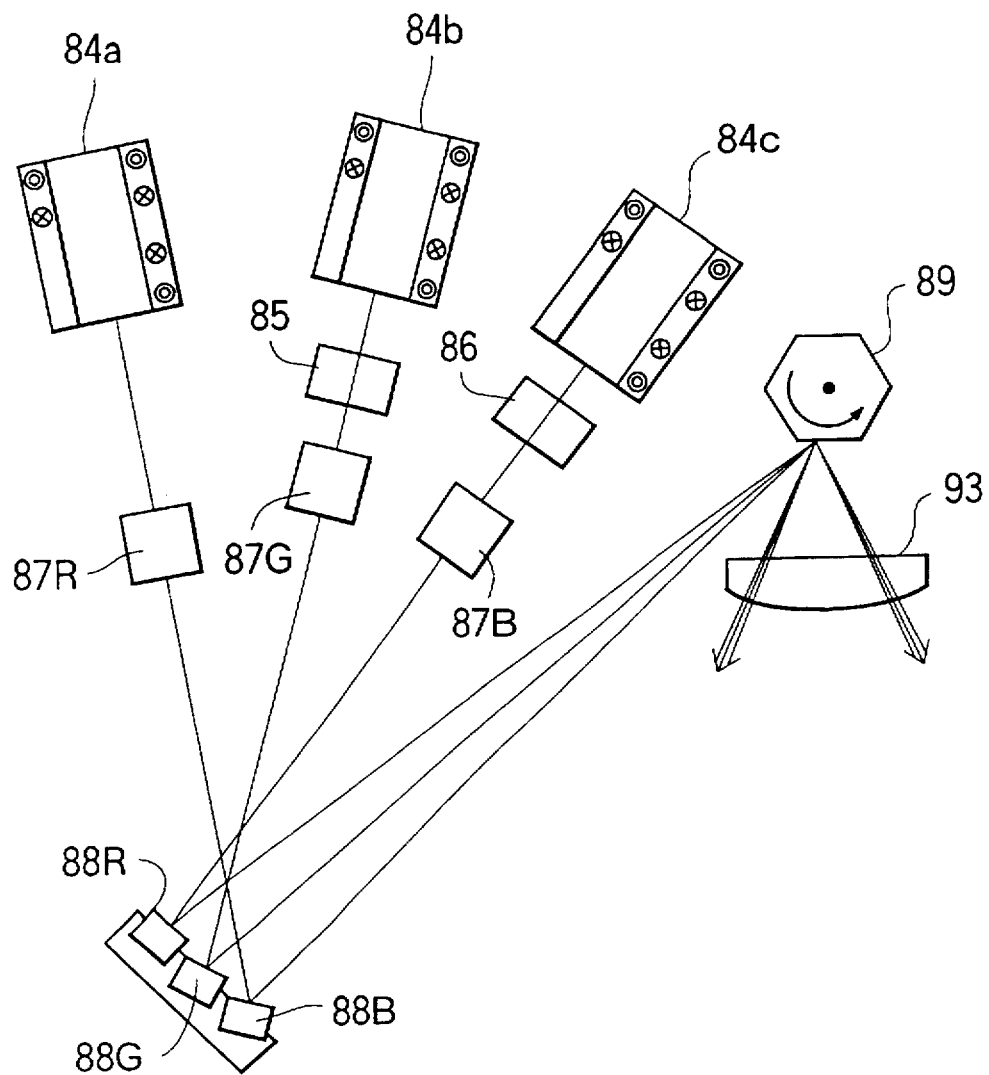
FIG. 8 is a schematic view of a laser beam irradiating device of the image output apparatus.

FIG. 8 is a schematic view of the laser beam irradiating device 82. The laser beam irradiating device 82 has semiconductor laser beam sources 84a, 84b, 84c for producing red laser beams. The laser beam emitted by the semiconductor laser beam source 84b is converted to a green laser beam by wavelength converting device 85 and the laser beam emitted by the laser beam source 84c is converted to a blue laser beam by a wavelength converter 86. The red laser beam emitted by the laser beam source 84a, the green laser beam wavelength-converted by the wavelength converting means 85 and the blue laser beam wavelength-converted by the wavelength converter 86 enter light modulators 87R, 87G, 87B, which can be acousto-optic modulators (AOMs) or the like. The light modulators 87R, 87G, 87B are each input with a modulation signal from the modulator drive means 83 and modulate the intensities of the laser beams in accordance with the modulation signals. The laser beams modulated in intensity by the light modulators 87R, 87G, 87B are reflected onto a polygonal mirror 89 by reflecting mirrors 88R, 88G, 88B.

The image output apparatus 8 is equipped with a magazine 91 for accommodating a roll of color photographic paper 90 which is conveyed along a prescribed conveyance path running in the sub-scanning direction. Punching device 92 is installed on the conveyance path of the color photographic paper 90 for punching reference holes in the edge of the color photographic paper 90 at intervals corresponding to the length of the individual color prints. The reference holes are used for synchronizing the conveyance of the color photographic paper 90 with the operation of the other device of the image output apparatus 8.

The laser beams modulated by the light modulators 87R, 87G, 87B are deflected by the polygonal mirror 89, pass through an θ lens 93 and expose the whole surface of the color photographic paper 90 by scanning it in the main scanning direction while it is being conveyed in the sub-scanning direction. The CPU 79 controls the conveyance speed of the color photographic paper 90 in the sub-scanning direction to synchronize it with the rotational speed of the main scanning direction, i.e., with the rotational speed of the polygonal mirror 89.

The color photographic paper 90 exposed by the laser beams is forwarded to a developing section having a developing tank 94, bleach-fixing tank 95 and washing tank 96, where it is subjected to prescribed color development, bleach-fixing fixing and washing, thereby reproducing on the color photographic paper 90 one or more color images based on the image data image-processed by the image processing apparatus 5. The color photographic paper 90 is then sent to a drying section 97 where it is dried, to a cutter 98 controlled based on the reference holes punched in the edge of the color photographic paper 90 to operate synchronously with the conveyance of the color photographic paper 90 so as to cut it into lengths each corresponding to the length of one image recorded in one frame of the film F or one color print P, and to a sorter 99 which sorts the cut pieces based on the individual rolls of the film F or by customer.

The developing tank 94, bleach-fixing tank 95, washing tank 96, drying section 97, cutter 98 and sorter 99 can be of the same type as used in an ordinary automatic developing machine.

Figure 9:
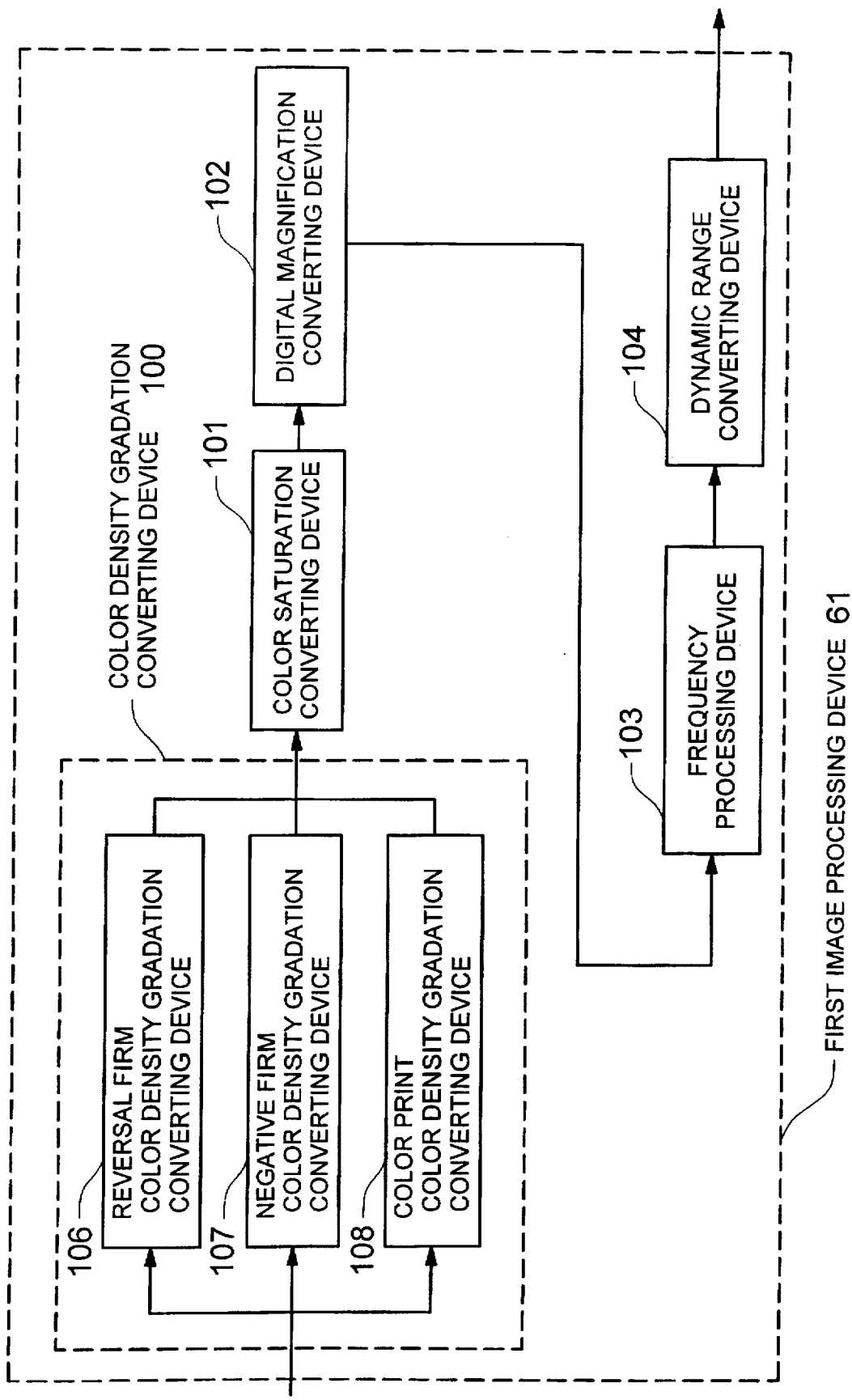
FIG. 9 is a block diagram showing the particulars of the first image processing apparatus of FIG. 5.

FIG. 9 is a block diagram showing the particulars of the first image processing device 61 of an image processing apparatus which is a preferred embodiment of the invention.

The first image processing device 61 comprises color density gradation converting device 100 for converting the color signal level, density signal level and gradation signal level of the input image data, color saturation converting device 101 for converting color saturation data of the image data, digital magnification converting device 102 for converting the number of pixels of the image data, frequency processing device 103 for frequency-processing the image data and dynamic range converting device 104 for converting the dynamic range of the image data. The color density gradation converting device 100 includes reversal film color density gradation converting device 106 for converting the color signal level, density signal level and gradation signal level of image data obtained by reading out a color image recorded on a reversal film F, negative film color density gradation converting device 107 for converting the color signal level, density signal level and gradation signal level of image data obtained by reading out a color image recorded on a negative film F and color print color density gradation converting device 108 for converting the color signal level, density signal level and gradation signal level of image data obtained by reading out a color image recorded on a color print P. The operator uses the keyboard 69 to indicate whether the image to be reproduced is recorded on reversal film F, negative film F or color print P and the CPU 60 selects the appropriate one of the color density gradation converting device 106, 107, 108.

Figure 10:
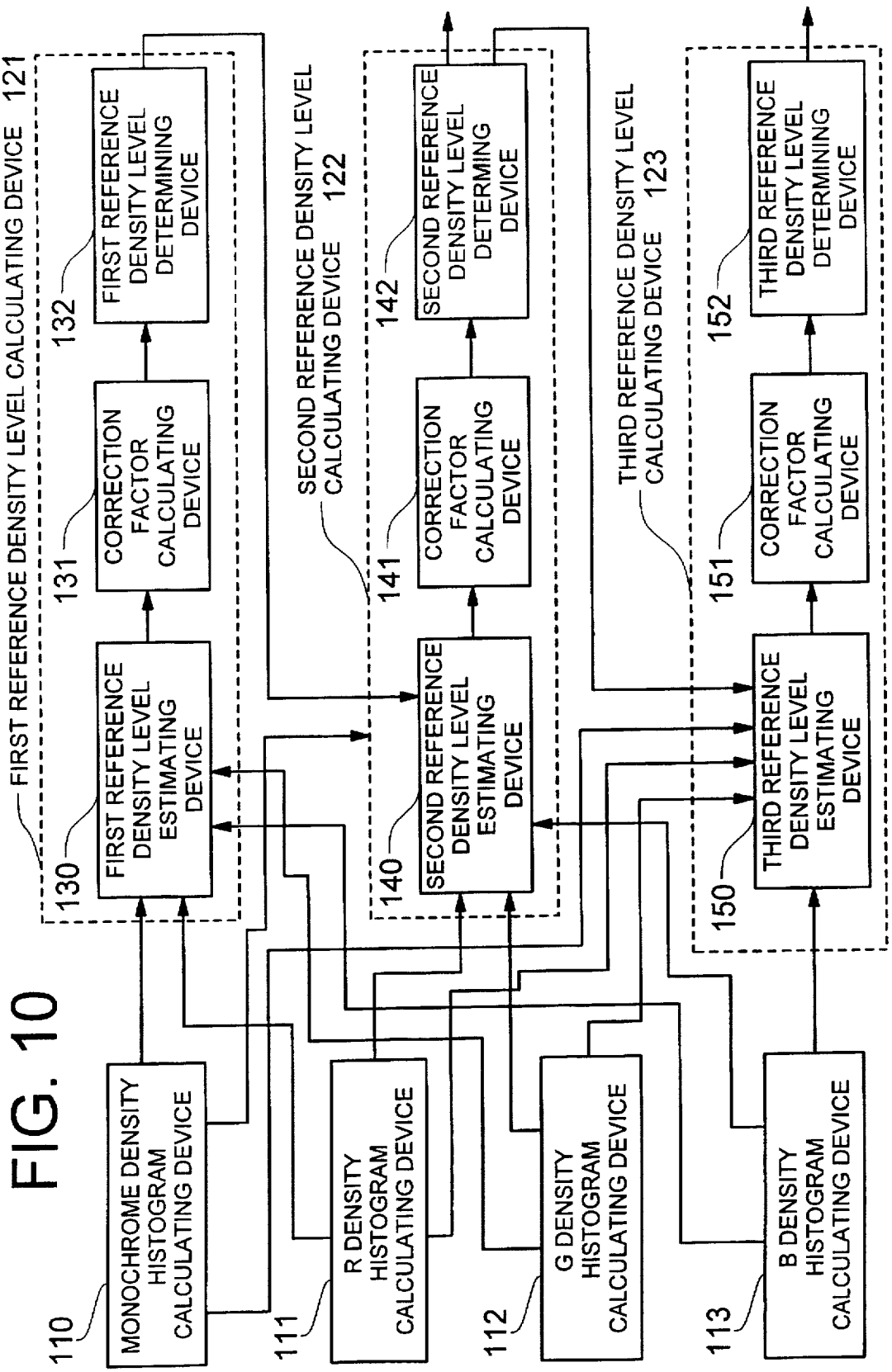
FIG. 10 is a detailed block diagram showing part of a color density gradation converting device of an image processing apparatus which is an embodiment of the invention, the remainder of which is shown in FIG. 11.
Figure 11:
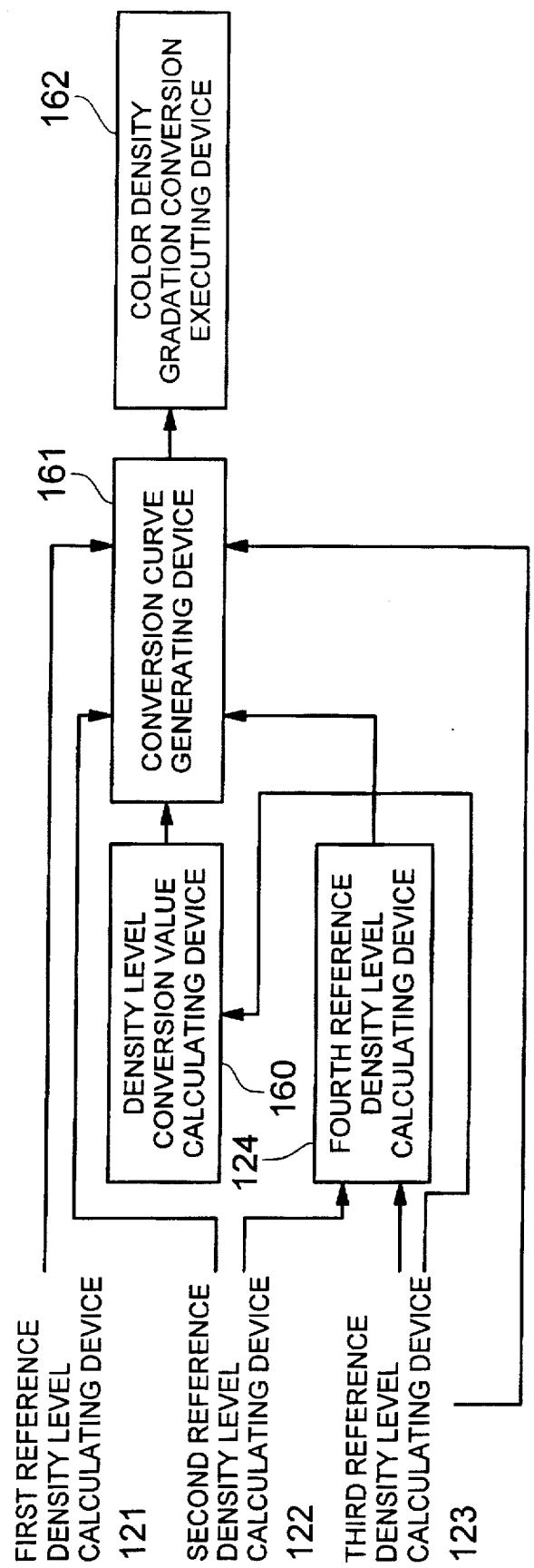
FIG. 11 is a detailed block diagram showing part of color density gradation converting device of an image processing apparatus which is an embodiment of the invention, the remainder of which is shown in FIG. 10.

FIGS. 10 and 11 are detailed block diagrams of the reversal film color density gradation converting device 106.

The reversal film color density gradation converting device 106 processes the image data obtained by reading out the color image recorded on a reversal film F to determine a first reference density level and a second reference density level corresponding to white regions thereof and a third reference density level corresponding to black regions thereof, converts each density level to a prescribed density level, converts the density level of image data corresponding to intermediate density regions of the color image recorded on the reversal film F to a prescribed level, and generates a conversion curve for converting the gradation signal level of the image data as a whole. In this embodiment, the reversal film color density gradation converting device 106 includes monochrome density histogram calculating device 110 for calculating a histogram of the density signal when the read-out color image is converted to a monochrome image, R density histogram calculating device 111 for calculating a histogram of the R density level, G density histogram calculating device 112 for calculating a histogram of the G density level, B density histogram calculating device 113 for calculating a histogram of the B density level, first reference density level calculating device 121 for calculating the first reference density level corresponding to the density of white regions of the color image or the image data, second reference density level calculating device 122 for calculating the second reference density level which corresponds to the density of white regions of the color image and is higher than the first reference density level, third reference density level calculating device 123 for calculating the third reference density level corresponding to the density of black regions of the color image and fourth reference density level calculating device 124 for calculating a fourth reference density level corresponding to an intermediate density of the color image. The first reference density level calculating device 121 comprises first reference density level estimating device 130 for estimating the first reference density level, correction factor calculating device 131 for calculating a correction factor for correcting the first reference density level estimated by the first reference density level estimating means 130, and first reference density level determining device 132 for determining the first reference density level by correcting the estimated first reference density level from the first reference density level estimating device 130 in accordance with the correction factor calculated by the correction factor calculating device 131. The second reference density level calculating device 122 comprises second reference density level estimating device 140 for estimating the second reference density level, correction factor calculating device 141 for calculating a correction factor for correcting the second reference density level estimated by the second reference density level estimating device 140, and second reference density level determining device 142 for determining the second reference density level by correcting the estimated second reference density level from the second reference density level estimating device 140 in accordance with the correction factor calculated by the correction factor calculating device 141. The third reference density level calculating device 123 comprises third reference density level estimating means 150 for estimating the third reference density level, correction factor calculating device 151 for calculating a correction factor for correcting the third reference density level estimated by the third reference density level estimating device 150, and third reference density level determining device 152 for determining the third reference density level by correcting the estimated third reference density level from the third reference density level estimating device 150 in accordance with the correction factor calculated by the correction factor calculating device 151.

The reversal film color density gradation converting device 106 further includes density level conversion value calculating device 160 for calculating the density levels to which the first reference density level, second reference density level, third reference density level and fourth reference density levels are to be converted, conversion curve generating device 161 for generating conversion curves for converting the gradation signal level of the image data and a color density gradation conversion executing means 162 for converting the gradation signal level of the image data based on the conversion curves generated by the conversion curve generating device 161.

The color image reproducing system including the transmission type image read-out apparatus 10 or the reflection type image read-out apparatus 30, the image processing apparatus 5 and the image output apparatus 8 reads out a color image recorded on a film F or a color print P, generates image data, image-processes the image data and reproduces the color image. These operations will now be described in detail in the following.

In the case of reproducing a color image recorded on a negative, reversal or other such film F, the transmission type image read-out apparatus 10 is connected through its interface 21 with the interface 48 of the image processing apparatus 5 and the film F is set in the carrier 22. When the film F has been set in the carrier 22, the CPU 60 outputs a drive signal to the motor 23 and the motor 23 drives the rollers 24. As a result, the film F is conveyed in the direction of the arrow. The picture region detection sensor 25 detects the density distribution of the film F and outputs the result of the detection to the CPU 26 as density signal. Based on this density signal, the CPU 26 detects the picture position of the color image and when it finds that the picture of the color image has reached the prescribed position, it stops the motor 23. As a result, the color image recorded on the film F is stopped at a prescribed picture position relative to the CCD area sensor 15 and the lens 16. The light source 11 then emits light at a prescribed time thereafter and the light regulating unit 12 regulates the quantity of the light passed in the direction of the film F. In this embodiment, the color image recorded in a single frame of the film is read out twice. The image data obtained by the first read-out (preliminary read-out) are used as the basis for deciding the image read-out conditions in the second read-out (main read-out). Specifically, the main read-out is conducted after adjustment of the quantity of light directed onto film F by the light regulating unit 12 and adjustment of the storage time of the CCD area sensor 15. During the preliminary read-out, therefore, the light emitted by the light source 11 is adjusted to a prescribed quantity by the light regulating unit 12 and then separated into three colors, R (red), G (green) and B (blue), by the color separation unit 13. The film F is first irradiated with R (red) light, then with G (green) light and finally with B (blue) light. The light transmitted through the film F is photoelectrically read by the CCD area sensor 15.

The image data corresponding to one field generated when the CCD area sensor 15 reads out the color image are amplified by the amplifier 17 and converted to digital signals by the A/D converter 18. The image data converted to digital signals are corrected for dark current and variance in sensitivity among the individual pixels by the CCD correcting device 19 and then converted to density data by the log converter 20, whereafter the image data of only a single odd field or even field are sent line by line to the image processing apparatus 5 through the interface 21 and the interface 48.

On the other hand, in the case of reproducing a color image recorded on color print P, the reflection type image read-out apparatus 30 is connected through its interface 41 with the interface 48 of the image processing apparatus 5 and the color print P is set in a carrier (not shown). Light emitted by the light source 31 is reflected from the surface of the color print P, is reflected by the mirror 32, passes through the color balance filter 33, which adjusts its R, G, B sensitivity, and is adjusted in quantity by the light regulating unit 34. Similarly to what was explained earlier, in the preliminary read-out the light emitted by the light source 31 is regulated to a prescribed quantity by the light regulating unit 34 and is received and photoelectrically read by the CCD line sensor 35 constituted of three line sensors corresponding to R, G, B. At this time, the light source 31 and the mirror 32 are moved at a prescribed speed in the arrow direction, i.e. the sub-scanning scanning direction, by a drive device (not shown). As a result, the color image recorded on the color print P held in the carrier is three dimensionally read out and the CCD line sensor 35 generates image data corresponding to R, G, B. The speed of the light source 31 and the mirror 32, i.e., the sub-scanning speed, is set much higher during the preliminary read-out than during the main read-out.

The image data corresponding to R, G, B generated by the CCD line sensor 35 are amplified by the amplifier 37 and converted to digital signals by the A/D converter 38. The image data converted to digital signals are corrected for dark current and variance in sensitivity among the individual pixels by the CCD correcting means 39 and then converted to density data by the log converter 40, whereafter the image data are sent line by line to the image processing apparatus 5 through the interface 41 and the interface 48.

Upon receiving the image data from the transmission type image read-out apparatus 10 or the reflection type image read-out apparatus 30, the image processing apparatus 5, specifically the arithmetic average computing device 49 thereof, sums and averages the values of sets of four adjacent pixels of the image data received line by line and defines the average values as single pixels, thereby reducing the number of pixels per line of the image data to ¼, whereafter the lines are stored alternately in the first line buffer 50a and the second line buffer 50b. During the preliminary read-out, the CPU 60 connects only the first frame memory unit 51 to the input bus 63 and disconnects the second frame memory unit 52 and the third frame memory unit 53 from the input bus 63. As a result, only the image data stored in one of the line buffers 50a, 50b are progressively transferred line by line to the first frame memory unit 51 as the preliminary read-out image data. In this way, the number of pixels corresponding to the color image recorded in one frame of film F or one color print P is reduced to 1/16 and the pixels are stored in the R data memory 51 R, the G data memory 51 G and the B data memory 51 B of the first frame memory unit 51 as image data corresponding to R, G, B, respectively.

The image data obtained by the preliminary read-out and stored in the first frame memory unit 51 are forwarded through the data bus 65 to the CPU 60 for analysis. Based on the image data obtained by the preliminary read-out, the CPU 60 generates a read-out control signal for optimally conducting the main read-out in light of the dynamic range of the CCD area sensor 15 or the CCD line sensor 35 and forwards the read-out control signal through the data bus 65 to the CPU 26 of the transmission type image read-out apparatus 10 or the CPU 46 of the reflection type image read-out apparatus 30. In addition, the CPU 60 automatically decides the main read-out conditions for enabling an image of optimum density, gradation and tone to be reproduced on the color photographic paper 90 based on the image data obtained by the main read-out.

Based on the read-out control signal received from the CPU 60, the CPU 26 of the transmission type image read-out apparatus 10 or the CPU 46 of the reflection type image read-out apparatus 30 controls the light regulating unit 12 or the light regulating unit 34 during the main read-out so that the film F is irradiated with the prescribed quantity of light or the CCD line sensor 35 receives the prescribed quantity of reflected light from the color print P. The CPU 26 or the CPU 46 also adjusts the storage time of the CCD area sensor 15 or the CCD line sensor 35.

If required, the CPU 60 at the same time forwards control signals through the data bus 65 to the first image processing means 61 and the second image processing means 62 so as to adjust the image processing parameters and other image processing conditions in line with the results of the analysis of the image data read out in the preliminary read-out.

Further, the image data obtained by the preliminary read-out and stored in the first frame memory unit 51 are sent to the second image processing device 62, which subjects them to gradation correction, color conversion, density conversion and other such image processing by use of lookup tables or matrix computation, and are then sent through the data bus 65 to the CRT 68 to display a color image on the screen of the CRT 68.

Upon viewing the color image displayed on the screen of the CRT 68, the operator can, if necessary, use the keyboard 69 to adjust the image read-out conditions for the main read-out and/or the image processing conditions. When the operator uses the keyboard 69 to input an instruction to adjust the image read-out conditions and/or the image processing conditions for the main-read out, the instruction signal from the keyboard 69 is input to the CPU 60 through the data bus 65. Based on the instruction signal, the CPU 60 generates a control signal which it sends through the data bus 65 to the CPU 26 of the transmission type image read-out apparatus 10 or the CPU 46 of the reflection type image read-out apparatus 30, and/or the first image processing device 61, and/or the first image processing device 61 so as to adjust the image read-out conditions and/or the image processing conditions. In the present embodiment, since the data bus 65 is formed independently of the input and output buses 63, 64 of the first frame memory unit 51, the second frame memory unit 52 and the third frame memory unit 53, the operator can input various instructions or display a color image on the screen of the CRT 68 even during input or output of image data to or from the first frame memory unit 51, the second frame memory unit 52 or the third frame memory unit 53.

Once the image read-out conditions and/or the image processing conditions for the main read-out have been decided from the results of the preliminary readout, the main read-out is conducted. In the main read-out, the CCD area sensor 15 of the transmission type image read-out apparatus 10 generates an odd field and an even field of image data of the color image recorded in one frame of the film F or the CCD line sensor 35 of the reflection type image read-out apparatus 30 reads the color image recorded on a single color print P at a low sub-scanning speed to generate image data which is input line by line to the image processing apparatus 5 through the interface 21 or the interface 41 and the interface 48.

Although the image data obtained by the main read-out and input to the image processing apparatus 5 are input to the arithmetic average computing device 49, the arithmetic average computing device 49 does not carry out any addition processing on the image data during the main read-out but instead forwards the lines of the input image data alternately, line by line, to the first line buffer 50a and the second line buffer 50b. During the main read-out, the CPU 60 connects only the one of the second frame memory unit 52 and the third frame memory unit 53 to which image data can be written to the input bus 63 and disconnects the other of these two frame memories and the first frame memory unit 51 from the input bus 63. In other words, while color image read-out is in progress, one among the first frame memory unit 51, the second frame memory unit 52 and the third frame memory unit 53 is connected to the input bus 63, and image data is stored only in this frame memory. This arrangement is for enhancing the data processing efficiency of the color image reproducing system by making it possible to conduct preliminary read-out of the color image recorded in the next frame of the film F or the color image recorded in another color print P while the image data obtained in the preceding main read-out and corresponding to the color image in the preceding frame of the film F or the color image recorded in the preceding color print P are being transferred to the first image processing device 61 through the output bus 64 and the selector 55, and also making it possible to complete the preliminary read-out of the color image recorded in the next frame of the film F or the color image recorded in another color print P and conduct the main read-out of the color image recorded in the next frame of the film F or the color image recorded in another color print P while the image data obtained in the preceding main read-out and corresponding to the color image in the preceding frame of the film F or the color image recorded in the preceding color print P are being transferred to the first image processing device 61 through the output bus 64 and the selector 55. Accordingly, the image data alternately stored in the first line buffer 50a and the second line buffer 50b one line at a time are transferred to second frame memory unit 52 or the third frame memory unit 53, where the image data corresponding to R (red) are stored in the R data memory 52R or 53R, the image data corresponding to G (green) are stored in the G data memory 52G or 53G, and the image data corresponding to B (blue) are stored in the B data memory 52B or 53B. Thus the image data corresponding to the color image recorded in one frame of the film F or one color print P are stored in the second frame memory unit 52 or the third frame memory unit 53.

After the image data obtained by the main read-out have been stored in R data memory 52R or 53R, G data memory 52G or 53G and the B data memory 52B or 53B of the second frame memory unit 52 or the third frame memory unit 53, the image data are output to the first image processing device 61. At this time, the CPU 60 controls the selector 55 to output to the first image processing device 61 only the image data stored in one or the other of the second frame memory unit 52 and the third frame memory unit 53.

Based on the signal output in response to the information input by the operator through the keyboard 69 as to whether the color image is recorded on a reversal film F, a negative film F or a color print P, the CPU 60 selects one of the three color density gradation converting means in the color density gradation converting device 100, namely, the reversal film color density gradation converting device 106, the negative film color density gradation converting device 107 or the color print color density gradation converting device 108, and the selected color density gradation converting device converts the color signal level, the density signal level and the gradation signal level of the image data. Since in this example a color image recorded on a reversal film F has been read out, the image data color signal level, density signal level and gradation signal level are converted by the reversal film color density gradation converting device 106.

Based on the image data input to the reversal film color density gradation converting device 106, the monochrome density histogram calculating device 110 of the reversal film color density gradation converting device 106 calculates a histogram of the density signal when the read-out color image is converted to a monochrome image, the R density histogram calculating device 111 calculates a histogram of the R density level, the G density histogram calculating device 112 calculates a histogram of the G density level and the B density histogram calculating device 113 calculates a histogram of the B density level. The calculated histograms are sent to the first reference density level calculating device 121.

Figure 12:
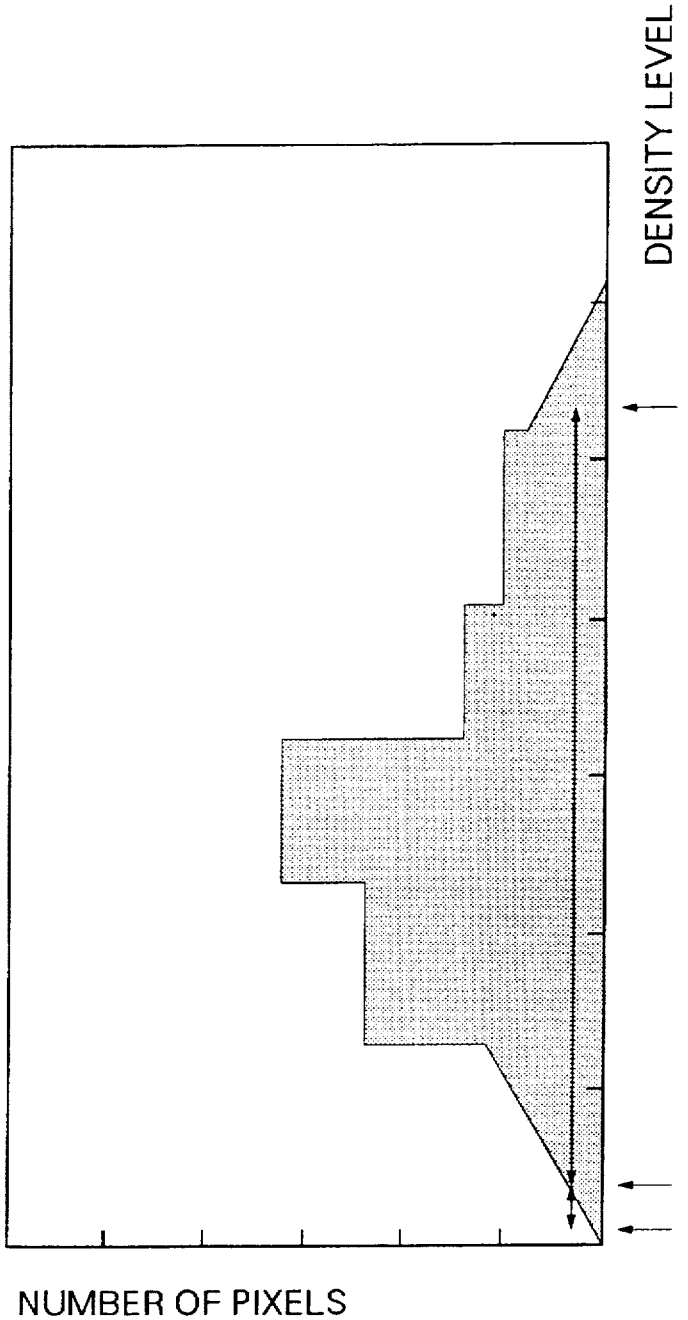
FIG. 12 is a graph showing an example of a K histogram.
Figure 13:
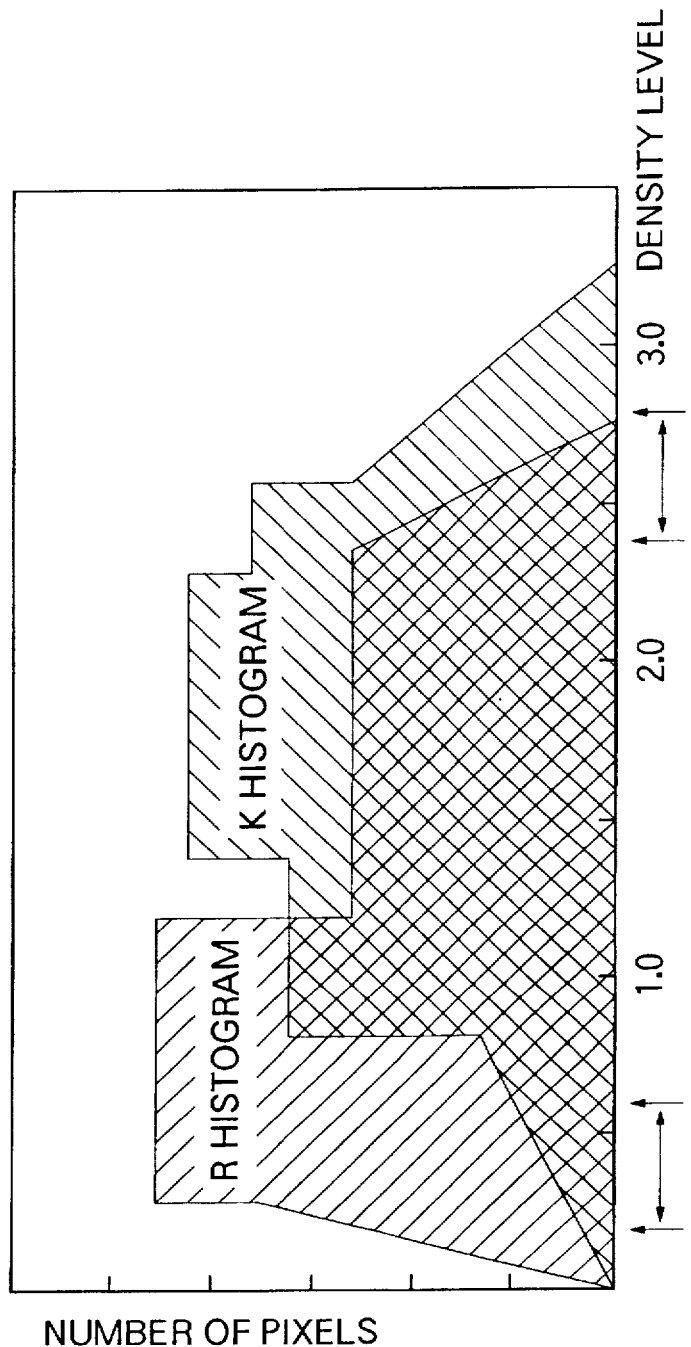
FIG. 13 is a graph showing the relationship between an R histogram and a K histogram.

FIG. 12 is a graph showing an example of a K histogram calculated by the monochrome density histogram calculating device 110, and FIG. 13 is a graph showing the relationship between an R density histogram calculated by the R density histogram calculating device 111 and a K histogram calculated by the monochrome density histogram calculating device 110, in the case of reading out a color image recorded on a reversal film.

Figure 14:
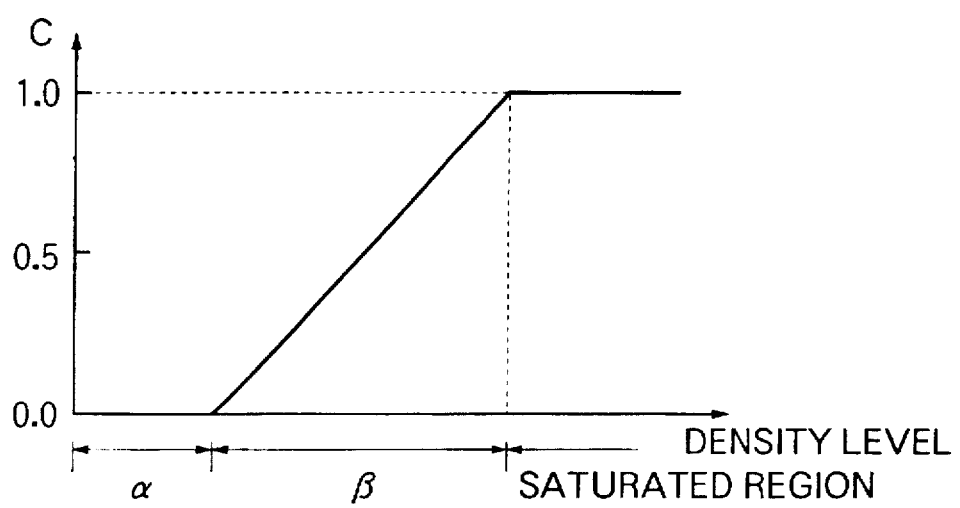
FIG. 14 is a graph for deriving a correction factor.
Figure 15:
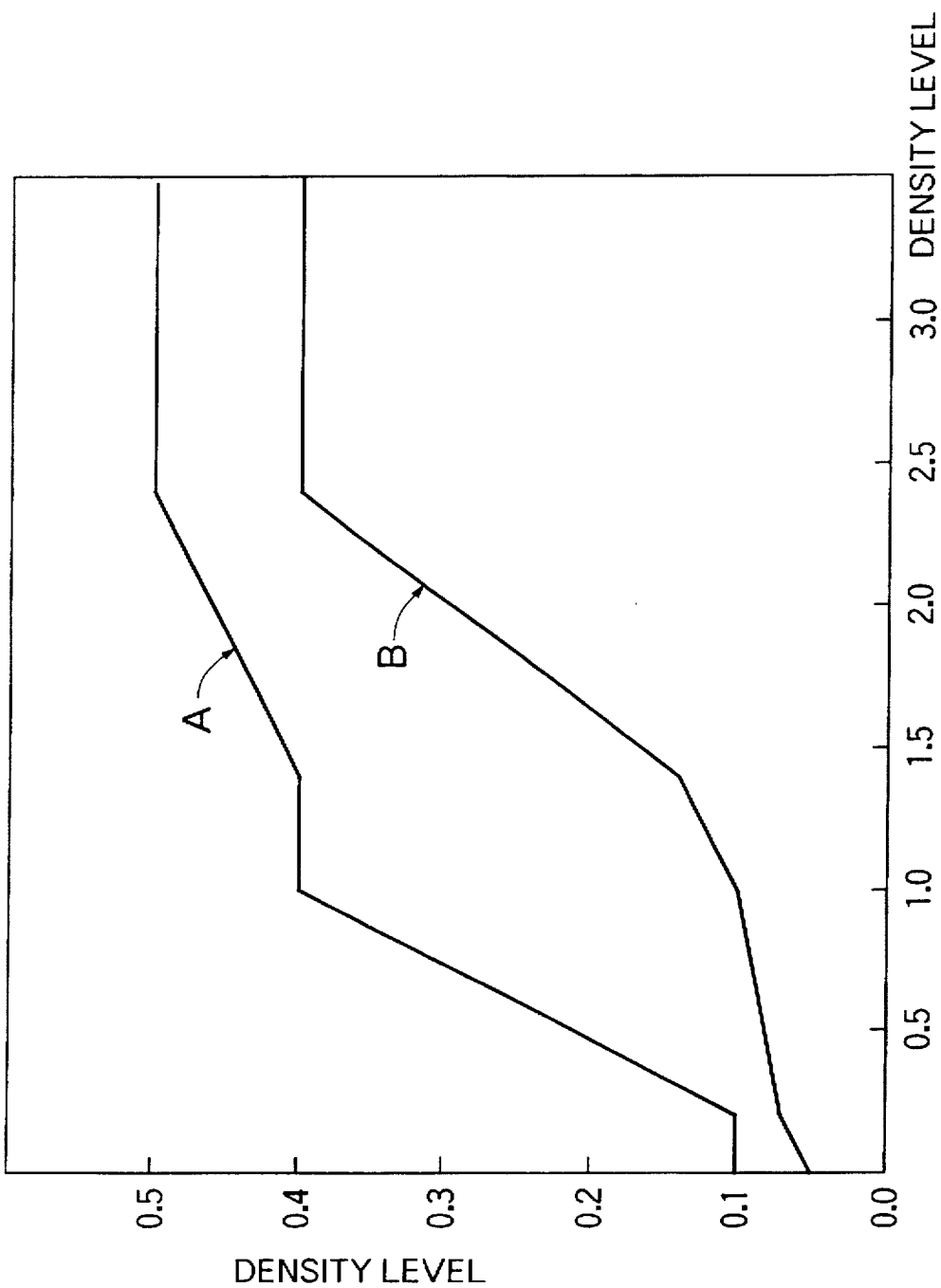
FIG. 15 is a graph for deriving $\alpha$ and $\beta$ of FIG. 13.

The first reference density level calculating device 121 calculates a first reference density level based on the input histograms. Specifically, the first reference density level estimating device 130 of the first reference density level calculating device 121 makes calculations based on the K histogram, the R histogram, the G histogram and the B histogram to determine the density levels $K_{x1}$, $R_{x1}$, $Gx_1$ and $B_{x1}$ at which the cumulative number of pixels becomes x1% of the total image data and forwards the calculated density levels to the correction factor calculating device 131 of the first reference density level calculating device 121. The value of x1% can be set in the range of 0.1 to 1.0%, for example. $K_{x1}$ obtained in this way can, by and large, be considered to correspond to the density of the white regions of the read-out color image. However, since the K histogram is a histogram of the density level when the read-out color image is converted to a monochrome image and is the average values of the R, G and B density levels, cases may arise in which, for example, the G and B components are nearly zero and the density level $Kx_1$ corresponds only to the regions consisting solely of the R component, i.e., to the density of the red regions. The correction factor calculating device 131 therefore calculates the absolute value of the differences between $K_{x1}$ and each of $R_{x1}I$ $Gx1$ and $B_{x1}$ and corrects the density level $K_{x1}$ based on the absolute values of these differences. The principle involved here is that if the density level $K_{x1}$ corresponds to the density level of the white regions of the color image, and the values of R, G and B should be nearly equal accordingly the absolute values of the differences between $K_{x1}$ and $R_{x1}$, $K_{x1}$ and $G_{x1}$ and $K_{x1}$ and $B_{x1}$ should be nearly equal to each other and also be nearly equal to zero. From this it can be concluded that the probability that $K_{x1}$ represents a density level corresponding to the white regions of the color image increases as the largest of the absolute values of the differences between $K_{x1}$ and each of $R_{x1}$, $G_{x1}$ and $B_{x1}$ decreases. Conversely, the probability that it does not increases as the largest of the absolute values of these differences increases. In view of this, the correction factor calculating device 131 uses the graph shown in FIG. 14 to determine a correction factor C1 appropriate in light of the absolute differences between $K_{x1}$ and each of $R_{x1}$, $G_{x1}$ and $B_{x1}$. The values of $\alpha$ and $\beta$ in FIG. 14 are decided by use of the graph shown in FIG. 15. The curves A and B in FIG. 15 are respectively for determining the values of $\alpha$ and $\beta$. The curves A and B are determined empirically and stored in the correction factor calculating device 131. The values of $\alpha$ and $\beta$ are decided based on the curves A and B in accordance with the value of the absolute density level at which the K histogram becomes x2%. For example, when the absolute level at which x2%=3% and the K histogram becomes 3% is 2.0, $\alpha$ is approximately 0.46 and $\beta$ is approximately 0.3%.

The correction factor C1 obtained in this manner is output from the correction factor calculating device 131 to the first reference density level determining device 132. An experimentally determined first standard density level $K_{10}$, which is a standard first reference density level, is stored in the first reference density level determining device 132 in advance, and the first reference density level determining device 132 uses the following equation to decide the first reference density level $K_1$ from the density level $K_{x1}$ input from the first reference density level estimating device 130 and the correction factor C1 input from the correction factor calculating device 131. The first standard density level $K_{10}$ is set at 0.05, for instance.

$$K_1 = K_{10} \times C1 + K_{x1} \times (1-C1)$$

In other words, when the largest of the absolute values of the differences between $K_{x1}$ and each of $R_{x1}$, $G_{x1}$ and $B_{x1}$ is small, i.e., when the probability that $K_{x1}$ represents a density level corresponding to the white regions of the color image is high, so that the correction factor C1 becomes zero, the first reference density level $K_1$ becomes equal to the density level $K_{x1}$ estimated by the first reference density level estimating device 130. On the other hand, when the largest of the absolute values of the differences between $K_{x1}$ and each of $R_{x1}$, $G_{x1}$ and $B_{x1}$ is large, i.e., when the probability that $K_{x1}$ does not represent a density level corresponding to the white regions of the color image is high, the correction factor C1 becomes 1 and the first reference density level $K_1$ becomes equal to the first standard density level $K_{10}$ irrespective of the content of the actually measured K histogram.

The first reference density level $K_1$, calculated in this manner is output to the second reference density level determining device 142 of the second reference density level calculating device 122, the conversion curve generating device 161 and the color density gradation conversion executing device 162.

Next, the second reference density level calculating device 122 uses the K histogram, the R histogram, the G histogram and the B histogram input from the monochrome density histogram calculating device 110, the R density histogram calculating device 111, the G density histogram calculating device 112 and the B density histogram calculating device 113 to calculate a second reference density level corresponding to the density of the white regions of the read-out color image. The second reference density level corresponds to a higher density of the color image than that to which the first reference density level corresponds. Specifically, the second reference density level estimating device 140 of the second reference density level calculating device 122 makes calculations based on the K histogram, the R histogram, the G histogram and the B histogram to determine the density levels $K_{y1}$, $R_{x1}$, $G_{y1}$ and $B_{y1}$ at which the cumulative number of pixels becomes y1% of the total image data and forwards the calculated density levels to the correction factor calculating device 141 of the second reference density level calculating device 122. The value of y1% set to a higher value than x1%, in the range of 1.0 to 5.0%, for example. The correction factor calculating device 141 determines a correction factor C2 in exactly the same manner as the correction factor calculating device 131 of the first reference density level calculating device 121 determines the correction factor C1 and forwards it to the second reference density level determining device 142.

Based on the first reference density level $K_1$ input from the first reference density level calculating device 121, the second reference density level determining device 142 makes a calculation by the following equation to determine a second standard density level $K_{20}$, which is a standard second reference density level. The value of $\delta k_1$ is an empirically determined constant stored in the second reference density level determining device 142. It is set to 0.15, for example.

$$K_{20} = K_1 + \delta k_1$$

The second reference density level determining device 142 then uses the so-calculated second standard density level $K_{20}$, the density level $K_{y1}$ input from the second reference density level estimating device 140 and the correction factor C2 input from the correction factor calculating device 141 to determine a second reference density level $K_2$ by a calculation using the following equation.

$$K_2 = K_{20} \times C2 K_{y2} \times (1-C2)$$

The calculated second reference density level $K_2$ is output to the third reference density level calculating device 123, the third reference density level determining device 152, the fourth reference density level calculating device 124, the conversion curve generating device 161 and the color density gradation conversion executing device 162.

In addition, the third reference density level calculating device 123 uses the K histogram, the R histogram, the G histogram and the B histogram input from the monochrome density histogram calculating device 110, the R density histogram calculating device 111, the G density histogram calculating device 112 and the B density histogram calculating device 113 to calculate a third reference density level corresponding to the density of the black regions of the read-out color image. Specifically, the third reference density level estimating device 150 of the third reference density level calculating device 123 conducts calculations based on the K histogram, the R histogram, the G histogram and the B histogram to determine the density levels $K_{z1}$, $R_{z1}$, $G_{z1}$ and $B_{z1}$ at which the cumulative number of pixels becomes z1% of the total image data and forwards the calculated density levels to the correction factor calculating device 151 of the third reference density level calculating device 123. The value of z1% is set in the range of 90.0% to 99.0%, for example. The correction factor calculating device 151 determines a correction factor C3 in exactly the same manner as the correction factor calculating device 131 of the first reference density level calculating device 121 determines the correction factor C1 and forwards it to the third reference density level determining device 152.

Based on the second reference density level $K_2$ input from the second reference density level determining device 142, the third reference density level determining device 152 makes a calculation by the following equation to determine a third standard density level $K_{30}$, which is a standard third reference density level. The value of $\delta k_3$ is an empirically determined constant stored in the third reference density level determining device 152. It is set to 2.5, for example.

$$K_{30}=K_2+\delta k_3$$

The third reference density level determining device 152 then uses the so-calculated third standard density level $K_{30}$, the density level $K_{z1}$ input from the third reference density level estimating device 150 and the correction factor C3 input from the correction factor calculating device 151 to determine a third reference density level $K_3$ by a calculation using the following equation.

$$K_3=K_{30}\times C3\ K_{z1}\times(1-C3)$$

The calculated third reference density level $K_3$ is output to the fourth reference density level calculating device 124, the density level conversion value calculating device 160, the conversion curve generating device 161 and the color density gradation conversion executing device 162.

The fourth reference density level calculating device 124 uses the second reference density level $K_2$ input from the second reference density level calculating device 122 and the third reference density level $K_3$ input from the third reference density level calculating device 123 to calculate a fourth reference density level $K_4$ by the following equation.

$$K_4=a\times K_2+(1-a)\times K_3,$$

where a is an empirically determined constant.

In the present embodiment, the density levels $K_{1CONV}$ and $K_{2CONV}$ to which the first reference density level and the second reference density level are to be converted are empirically determined and stored in density level conversion value calculating device 160 of the reversal film color density gradation converting device 106, and the density level conversion value calculating device 160 calculates only the density levels $K_{3CONV}$ and $K_{4CONV}$ to which the third reference density level and the fourth reference density level are to be converted.

An empirically determined standard conversion density level $K_{O3CONV}$ for the third reference density level is stored in the density level conversion value calculating device 160, and the density level conversion value calculating device 160 adjusts the standard conversion density level $K_{O3CONV}$ based on the gradation of the read-out color image to obtain the density level $K_{3CONV}$ to which the third reference density level is to be converted. Specifically, the density level conversion value calculating device 160 uses the K histogram input from the monochrome density histogram calculating device 110 and the third reference density level $K_3$ input from the third reference density level calculating device 123 to calculate the ratio of the pixels in the K histogram which have the third reference density level $K_3$ to all pixels. The so-obtained value r indicates the ratio to all pixels of the number of pixels of the black regions of the read-out color image whose density corresponds to the third reference density level $K_3$.

Figure 16:
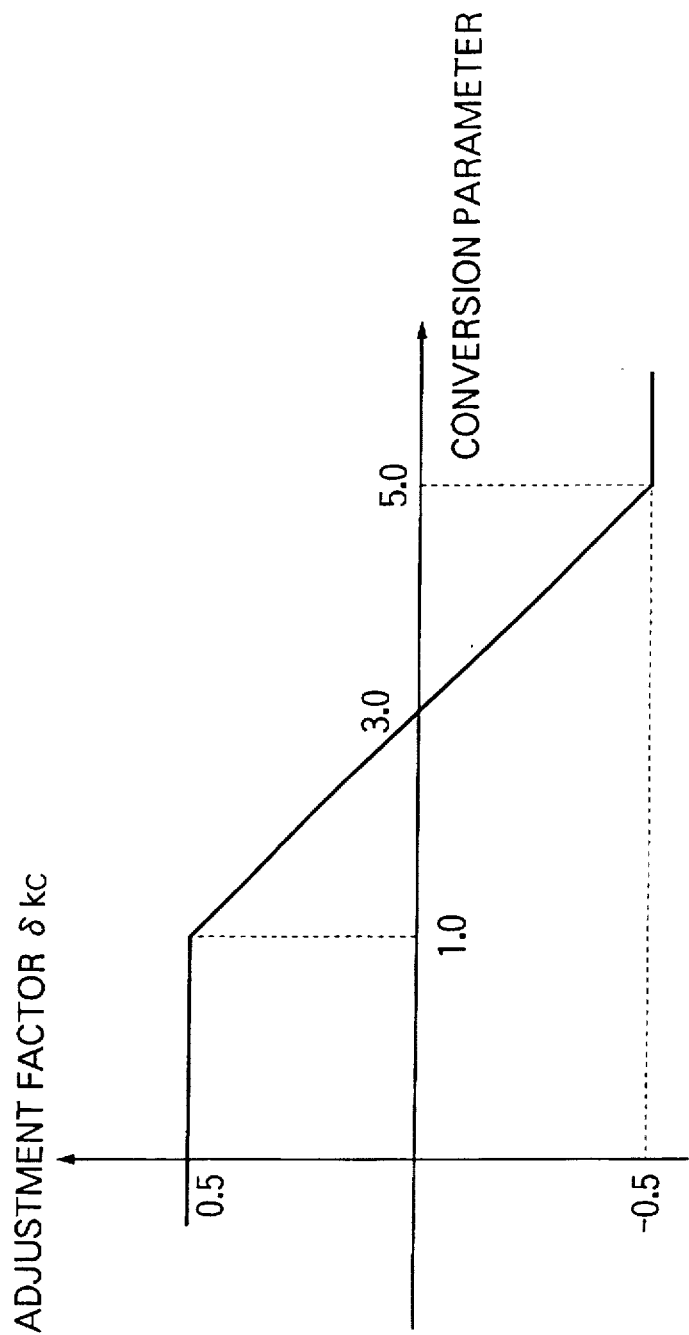
FIG. 16 is a graph showing an example of an adjustment curve.

The density level conversion value calculating device 160 then calculates the conversion parameter G by the following equation.

$$G=b_1\times r+b_2\times K_3,$$

where $b_1$ and $b_2$ are empirically determined constants. The so-obtained conversion parameter G indicates the tone of the read-out color image. Specifically, it can be considered that the larger the conversion parameter G, the higher the overall density of the read-out color image and that the smaller the conversion parameter G, the lower the overall density of the color image. Thus the density level conversion value calculating device 160 uses an empirically determined adjustment curve stored therein in advance to determine an adjustment factor $\delta K_C$. FIG. 16 shows an example of the adjustment curve which is empirically determined and stored in the density level conversion value calculating device 160. Once the adjustment factor $\delta K_C$ has been determined, the density level conversion value calculating device 160 calculates the density level $K_{3CONV}$ to which the third reference density level is to be converted by the following equation.

$$K_{3CONV}=K_{O3CONV}+\delta K_C$$

Next, the density level conversion value calculating device 160 calculates the density level $K_{4CONV}$ to which the fourth reference density level is to be converted by the following equation.

$$K_{4CONV}=c\times K_{2CONV}+(1-C)\times K_{3CONV},$$

where c is an empirically determined constant.

The so-obtained density levels $K_{1CONV}$, $K_{2CONV}$, $K_{3CONV}$ and $K_{4CONV}$ to which the reference density levels are to be converted are output to the conversion curve generating device 161.

Figure 17:
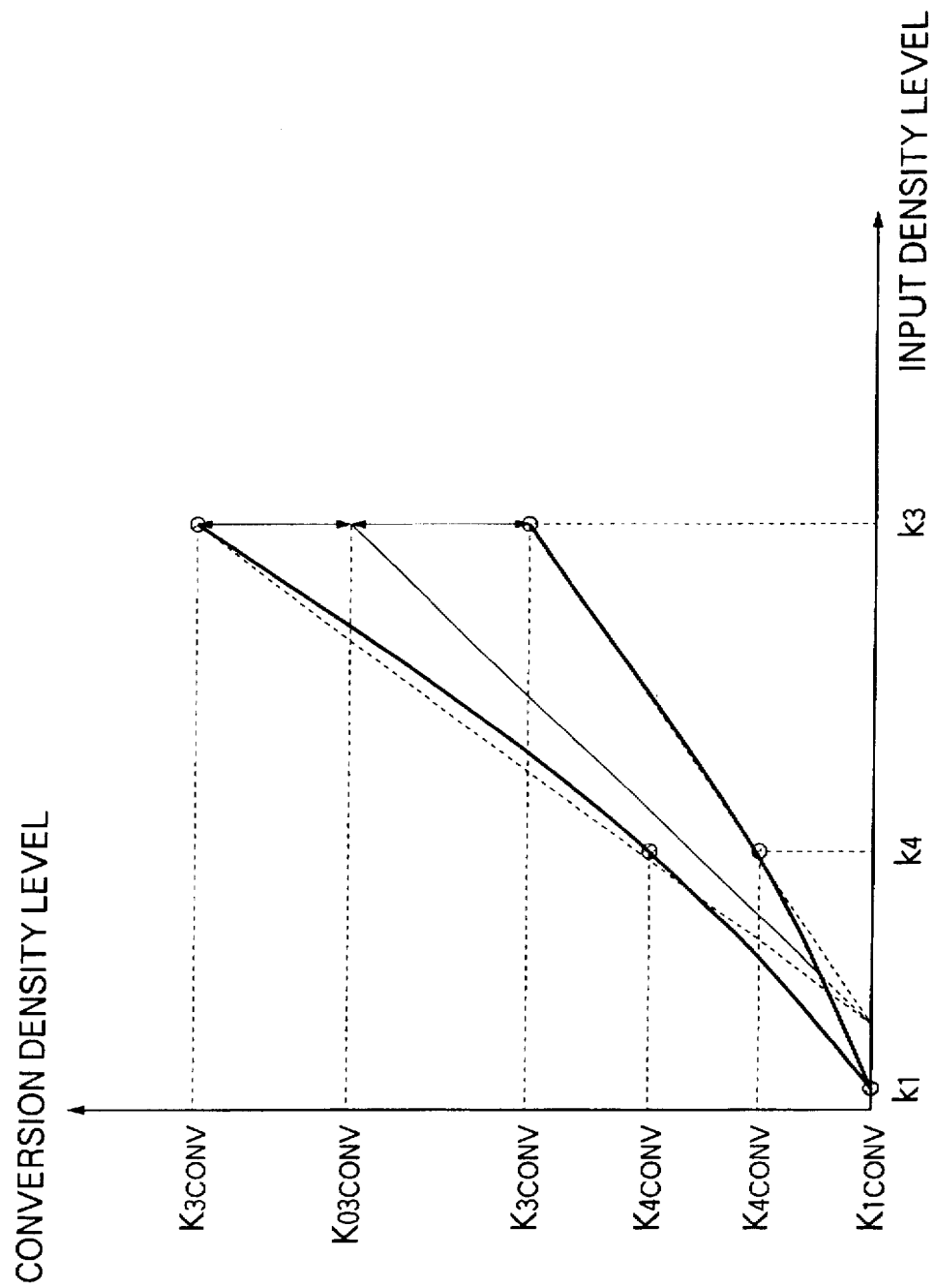
FIG. 17 is a graph showing examples of conversion curves for converting the gradation signal level of image data.

FIG. 17 shows examples of conversion curves for converting the gradation signal level of image data generated by conversion curve generating device 161.

The so-obtained conversion curves are output to the color density gradation conversion executing device 162, which executes the conversion of the gradation signal levels of the image data in accordance with the conversion curves.

The image data whose gradation signal levels have been automatically is converted by the color density gradation converting device 100 in this manner are input to the color saturation converting device 101, which converts the color saturation signal level, and then to the digital magnification converting device 102, which converts the number of pixels of the image data to be compatible with the size of the color image to be output. The image data are then sent to the frequency processing device 103 to be frequency-processed for edge enhancement and the like, to the dynamic range converting device 104 for conversion to a prescribed dynamic range and to the data synthesizing device 75.

If the operator inputs an instruction through the keyboard 69 indicating that the image data obtained by reading out the color image is to be merged with other data, the CPU 60 outputs a data merge signal to the data synthesizing device 75 and the data synthesizing device 75 reads the graphic, character or other image data to be merged from the merge data memory 76 and synthesizes it with the image data obtained by reading out the color image. On the other hand, if no such instruction is input through the keyboard 69, no further processing is conducted and the image data is output from the data synthesizing device 75 to the image output apparatus 8.

The image data input to the image output apparatus 8 from the data synthesizing device 75 of the image processing apparatus 5 via the interface 77 and the interface 78 are stored in the image data memory 80 consisting of multiple frame memories. Since the operation for read-out of a color image recorded on a film F or a color print P is not synchronized with the operation of the image output apparatus 8, the image data read out by the image read-out apparatus 1 and image-processed by the image processing apparatus 5 is input to the image output apparatus 8 without any relation to the processing in the image output apparatus 8. In the present embodiment, therefore, the image output apparatus 8 is equipped with the image data memory 80 whose multiple frame memories progressively store the image data input from the image processing apparatus 5. This arrangement ensures the ability of the image output apparatus 8 to reproduce color images on the color photographic paper 90 at the prescribed speed even when it is receiving image data being read out by the image read-out apparatus 1 at a high speed.

The operations of the various device of the image output apparatus 8 are synchronized by the CPU 79. In synchronism with the drawing of the color photographic paper 90 from the magazine 91 and the conveyance thereof along the prescribed conveyance path, the image data are read from the image data memory 80, converted to analog signals by the D/A converter 81 and input to the modulator drive device 83 to generate modulated signals. Meanwhile, the red laser beam emitted by the laser beam source 84a, the laser beam emitted by the semiconductor laser beam source 84b and converted to a green laser beam by the wavelength converting device 85 and the laser beam emitted by the laser beam source 84c and converted to a blue laser beam by the wavelength converter 86 enter the modulator 87R, modulator 87G and modulator 87B. The modulators 87R, 87G and 87B modulate the intensities of the respective beams in accordance with the modulation signals input thereto from the modulator drive device 83, i.e., in accordance with the image data, and the intensity-modulated laser beams are reflected by the reflecting mirrors 88R, 88G, 88B onto the polygonal mirror 89. The polygonal mirror 89 is rotated at a prescribed speed. The laser beams are deflected by the rotating polygonal mirror 89, pass through the fθ lens 93 and scan the surface of the color photographic paper 90 being conveyed in the sub-scanning direction. As a result, the color photographic paper 90 is scanned two-dimensionally by R, G and B laser beams. Since conveyance of the color photographic paper 90 in the sub-scanning direction is synchronized with the rotation of the polygonal mirror 89, the color photographic paper 90 is exposed to the laser beams congruously with the color image recorded on the film F or the color print P.

The color photographic paper 90 exposed to the laser beams in this manner is forwarded to the developing tank 94, developed, bleach-fixed in the bleach-fixing tank 95 and washed in the washing tank 96, thereby reproducing on the color photographic paper 90 one or more color images based on the image data image-processed by the image processing apparatus 5. The developed, bleach-fixed and washed color photographic paper 90 is forwarded to the drying section 97 to be dried, to the cutter 98 controlled based on the reference holes punched in the edge of the color photographic paper 90 to operate synchronously with the conveyance of the color photographic paper 90 so as to cut it into lengths each corresponding to the length of one image recorded in one frame of the film F or one color print P, and to a sorter 99 which sorts the cut pieces based on the individual rolls of the film F or by customer.

The present embodiment enables a color image recorded on a reversal film F to be read out, the gradation of the image data obtained by the read-out to be automatically converted in the desired manner, and a color image with the desired gradation to be reproduced.

Figure 18:
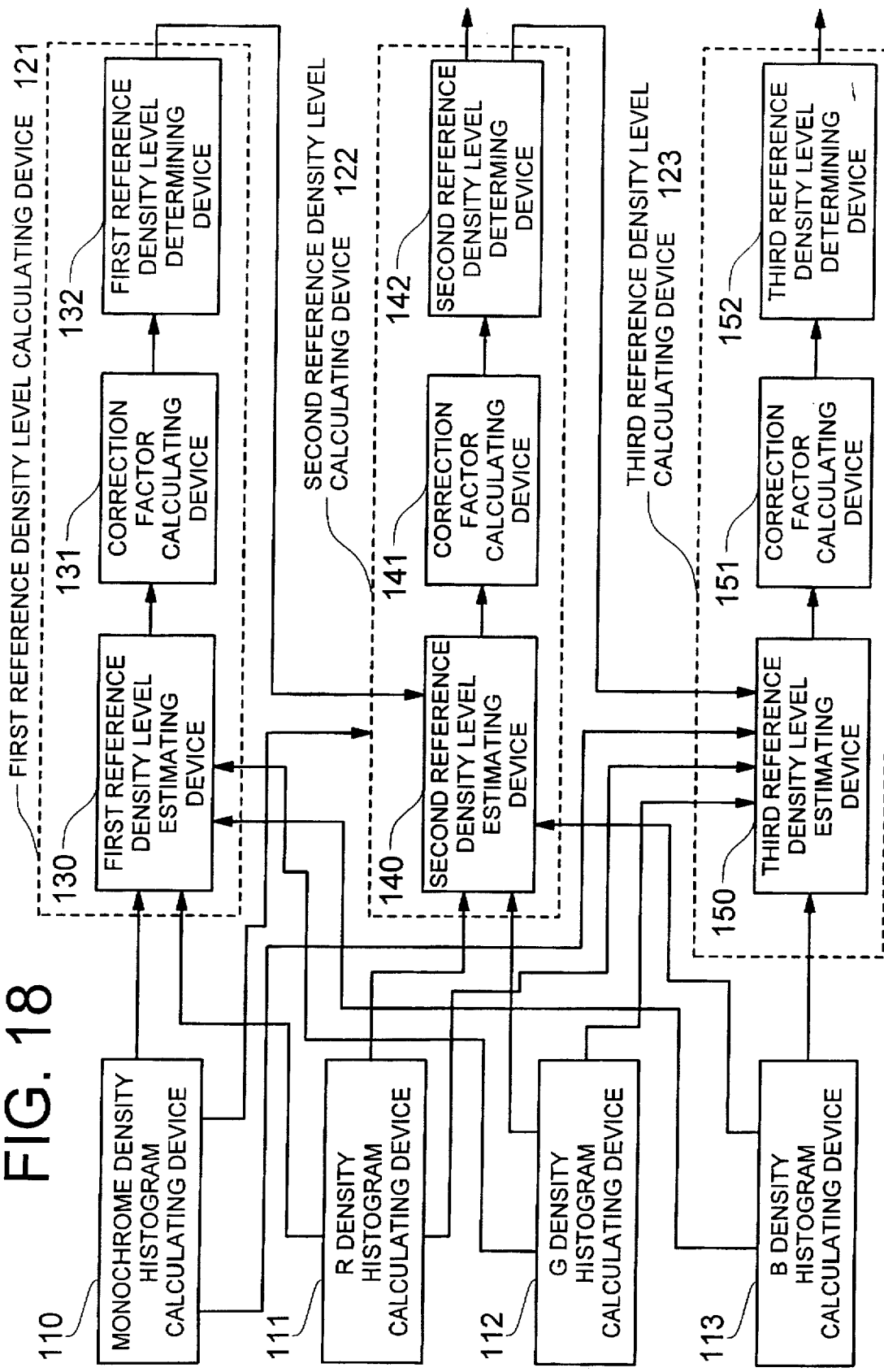
FIG. 18 is a block diagram showing part of color density gradation converting device for reversal film of an image processing apparatus which is another embodiment of the invention, the remainder of which is shown in FIG. 19.
Figure 19:
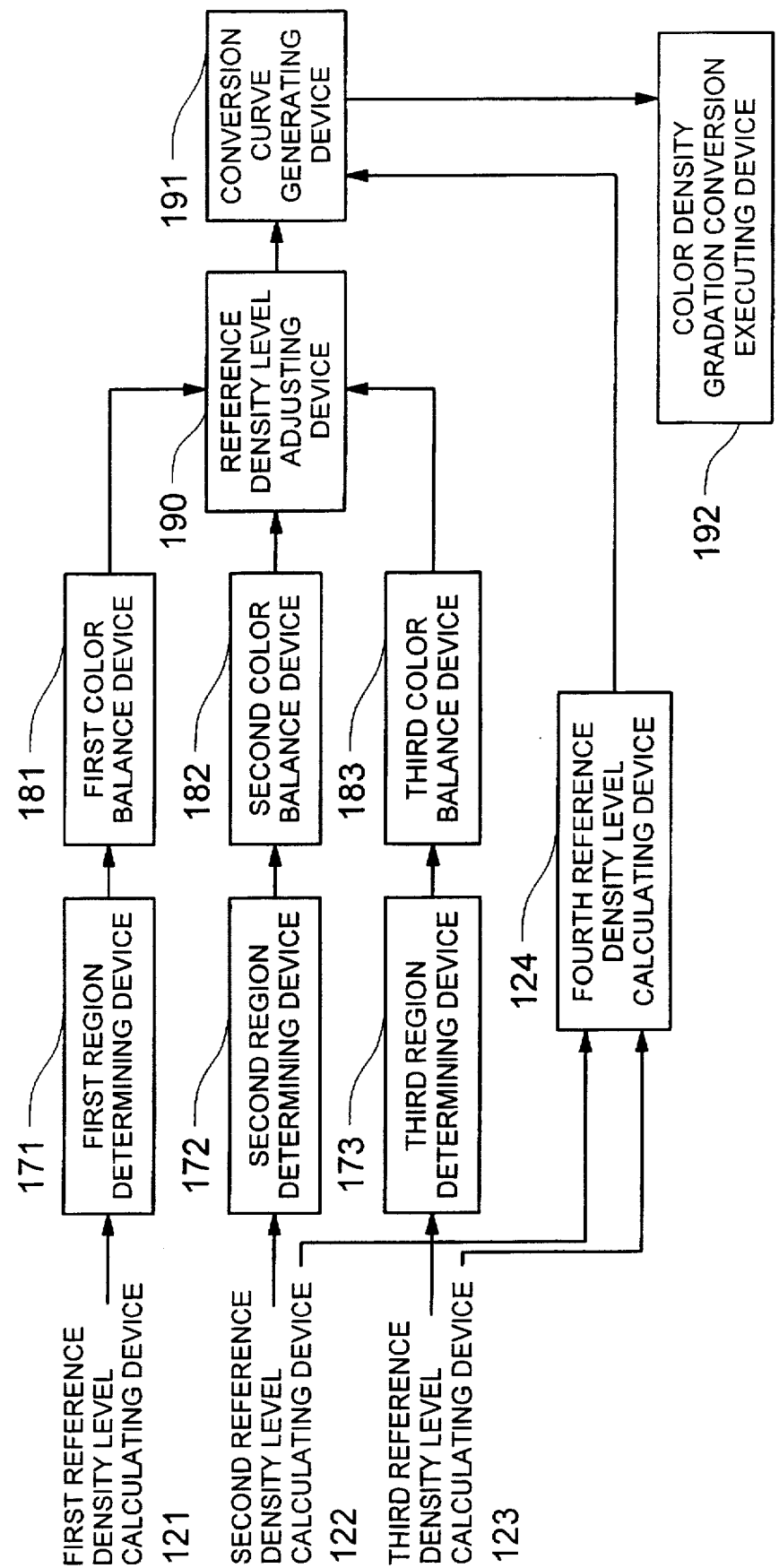
FIG. 19 is a detailed block diagram showing part of color density gradation converting device of an image processing apparatus which is another embodiment of the invention, the remainder of which is shown in FIG. 18.

FIGS. 18 and 19 are block diagrams of color density gradation converting device for reversal film of an image processing apparatus which is another embodiment of the invention.

The reversal film color density gradation converting device 106 of this embodiment conducts gradation signal level conversion using conversion curves derived for each of R, G and B.

As shown in FIGS. 18 and 19, the reversal film color density gradation converting device 106 of this embodiment includes first region determining device 171 for determining first regions, whose density level is at or below a first prescribed density level higher than the first reference density level calculated by the first reference density level calculating device 121, and whose color saturation level is at or below a first prescribed color saturation level; second region determining device 172 for determining second regions, whose density level is at or above a second prescribed density level lower than the second reference density level calculated by the second reference density level calculating device 122 and at or below a third prescribed density level higher than the second reference density level and whose color saturation level is at or below a second prescribed color level, ton level; third region determining device 173 for determining third regions, whose density level is at or above a fourth prescribed density level lower than the third reference density level calculated by the third reference density level calculating means 123 and whose color saturation level is at or below a third prescribed color saturation level; first color balance device 181 for calculating the average value of the ratios of the density level components corresponding to R, G, B to the density level of the pixels in the first regions; second color balance device 182 for calculating the average value of the ratios of the density level components corresponding to R, G, B to the density level of the pixels in the second regions; third color balance device 183 for calculating the average value of the ratios of the density level components corresponding to R, G, B to the density level of the pixels in the third regions; reference density level adjusting device 190 for using the average values of the ratios of the density level components corresponding to R, G, B to the density levels of the pixels in the respective regions calculated by the first color balance device 181, the second color balance device 182 and the third color balance device 183 as the basis for adjusting R, G, B of the first reference density level, the second reference density level and the third reference density level and determining the density levels to which the reference density levels are to be converted for each of R, G, B; conversion curve generating device 191 for generating conversion curves for converting the gradation signal level for each of R, G, B of the image data and color density gradation conversion executing device 192 for converting the gradation signal level of the image data based on the conversion curves generated by the conversion curve generating device 191.

In the so-constituted reversal film color density gradation converting device 106 of this embodiment, as in the reversal film color density gradation converting device 106 of the embodiment describe above, the first reference density level calculating device 121, the second reference density level calculating device 122 and the third reference density level calculating device 123 calculate the first reference density level $K_1$, the second reference density level $K_2$ and the third reference density level $K_3$. The first reference density level $K_1$ is output to the first region determining device 171 and the second region determining device 172, the second reference density level $K_2$ is output to the first region determining device 171, the second region determining device 172 and the third region determining device 173, and the third reference density level $K_3$ is output to the second region determining device 172 and the third region determining device 173.

Based on the input first reference density level $K_1$ and second reference density level $K_2$ the first region determining device 171 calculates the upper limit value $K_{1MAX}$ of the density level of the first regions by the following equation.

$$K_{1MAX} = c_1 \times K_1 + c_2 \times K_2,$$

where $c_1$ and $c_2$ are empirically determined constants.

Since the upper limit value $S_{1MAX}$ of the color saturation level of the first regions is empirically determined and stored in the first region determining device 171 and the lower limit value $S_{1MIN}$ of the color saturation level is set to zero, the first regions are determined by the first region determining device 171 in this manner.

Based on the input first reference density level $K_1$, second reference density level $K_2$ and third reference density level $K_3$, the second region determining device 172 calculates the lower limit value $K_{2MIN}$ and the upper limit value $K_{2MAX}$ of the density level of the second regions by the following equations.

$$K_{2MIN} = c_3 \times K_1 + c_4 \times K_2,$$

$$K_{2MAX} = c_5 \times K_2 + c_6 \times K_3,$$

where $c_3$, $c_4$, $c_5$ and $c_6$ are empirically determined constants.

Since the upper limit value $S_{2MAX}$ of the color saturation level of the second regions is empirically determined and stored in the second region determining device 172 and the lower limit value $S_{2MIN}$ of the color saturation level is set to zero, the second regions are determined by the second region determining device 172 in this manner.

Based on the input second reference density level $K_2$ and third reference density level $K_3$, the third region determining device 173 calculates the lower limit value $K_{3MIN}$ of the density level of the third regions by the following equation.

$$K_{3MIN} = c_7 \times K_2 + c_8 \times K_3,$$

where $c_7$ and $c_8$ are empirically determined constants.

Since the upper limit value $S_{3MAX}$ of the color saturation level of the third regions is empirically determined and stored in the third region determining device 173 and the lower limit value $S_{3MIN}$ of the color saturation level is set to zero, the third regions are determined by the third region determining device 173 in this manner.

Since color balance can be achieved unaffected by the R, G, B density levels, the upper limit value $S_{1MAX}$ of the first region color saturation level, the upper limit value $S_{2MAX}$ of the second region color saturation level and the upper limit value $S_{3MAX}$ of the third region color saturation level can each be set to a low value.

Once the first regions have been decided by the first region determining device 171 in this manner, the first color balance device 181 calculates the average values average values $R_{1r}$, $G_{1r}$, $B_{1r}$ of the ratios of the density level components corresponding to R, G, B to the density levels of the pixels in the first regions by the following equations and outputs them to the reference density level adjusting device 190.

$$R_{1r} = \Sigma\{R/(R + G + B)\}/N_1$$

$$G_{1r} = \Sigma\{G/(R + G + B)\}/N_1$$

$$B_{1r} = \Sigma\{B/(R + G + B)\}/N_1,$$

where $N_1$ is the number of pixels contained in the first regions and $\Sigma$ device that a summation is made with respect to the $N_1$ pixels contained in the first regions.

Similarly, once the second regions have been determined by the second region determining device 172, the second color balance device 182 calculates the average values average values $R_{2r}$, $G_{2r}$, $B_{2r}$ of the ratios of the density level components corresponding to R, G, B to the density levels of the pixels in the second regions by the following equations and outputs them to the reference density level adjusting device 190

$$R_{2r} = \Sigma\{R/(R + G + B)\}/N_2$$

$$G_{2r} = \Sigma\{G/(R + G + B)\}/N_2$$

$$B_{2r} = \Sigma\{B/(R + G + B)\}/N_2,$$

where $N_2$ is the number of pixels contained in the second regions.

Further, once the third regions have been determined by the third region determining device 173, the third color balance device 183 calculates the average values average values $R_{3r}$, $G_{3r}$, $B_{3r}$ of the ratios of the density level components corresponding to R, G, B to the density levels of the pixels in the third regions by the following equations and outputs them to the reference density level adjusting device 190.

$$R_{3r} = \Sigma\{R/(R + G + B)\}/N_3$$

$$G_{3r} = \Sigma\{G/(R + G + B)\}/N_3$$

$$B_{3r} = \Sigma\{B/(R + G + B)\}/N_3,$$

where $N_2$ is the number of pixels contained in the third regions.

The reference density level adjusting device 190 calculates R, G, B reference density levels $R_1$, $G_1$, $B_1$ by adjusting the first reference density level in accordance with the following equations.

$$R_1 = K_1 \times (R_{1r}/G_{1r})$$

$$G_1 = K_1$$

$$B_1 = K_1 \times (B_{1r}/G_{1r})$$

Similarly, the reference density level adjusting device 190 calculates R, G, B reference density levels $R_2$, $G_2$, $B_2$ and $R_3$, $G_3$, $B_3$ by adjusting the second reference density level and third reference density level in accordance with the following equations.

$$R_2 = K_2 \times (R_{2r}/G_{2r})$$

$$G_2 = K_2$$

$$B_2 = K_2 \times (B_{2r}/G_{2r})$$

$$R_3 = K_3 \times (R_{3r}/G_{3r})$$

$$G_3 = K_3$$

$$B_3 = K_3 \times (B_{2r}/G_{2r})$$

The reference density level adjusting device 190 further calculates R, G, B reference density levels $R_4$, $G_4$, $B_4$ by adjusting the fourth reference density level in accordance with the following equations.

$$R_4 = d \times R_2 + (1 - d) \times R_3$$

$$G_4 = d \times G_2 + (1 - d) \times G_3$$

$$B_4 = d \times B_2 + (1 - d) \times B_3,$$

where d is an experimentally determined constant.

In this embodiment, the density levels $K_{1CONV}$ and $K_{2CONV}$ to which the first reference density level and the second reference density level are to be converted are determined empirically in advance and stored in the reference density level adjusting device 190, the reference density level adjusting device 190 calculates the density levels $K_{3CONV}$ and $K_{4CONV}$ to which the third reference density level and the fourth reference density level are to be converted, by calculations similar to those of the density level conversion value calculating device 160 of the preceding embodiment, and outputs them to the conversion curve generating device 191 together with the reference concentration levels obtained in the foregoing manner, the conversion curve generating device 191 generates separate conversion curves for each of R, G, B and outputs them to the color density gradation conversion executing device 162 and the color density gradation conversion executing device 162 executes the conversion of the gradation signal levels of R, G, B of the image data in accordance with the conversion curves.

Since the present embodiment enables R, G, B color balancing, a color image with better balanced gradation can be reproduced in accordance with the gradation of the read-out color image.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, the CPU 26 or the CPU 46 uses the image data obtained by the preliminary read-out as the basis for adjusting the quantity of light in the main read-out by controlling the light regulating unit 12 or the light regulating unit 34 and also for controlling the storage time of the CCD area sensor 15 or the CCD line sensor 35. However, it is instead possible in the main read-out only to adjust the quantity of light by controlling the light regulating unit 12 or the light regulating unit 34 or only to control the storage time of the CCD area sensor 15 or the CCD line sensor 35. In addition or instead, moreover, it is possible to control the clock speed of the CCD area sensor 15 or the CCD line sensor 35.

Further, in the above embodiments, the conversion parameters are calculated based on the ratio of the pixels in the K histogram which have the third reference density level $K_3$ to all pixels. However, it is instead possible to calculate the conversion parameters based on some other density level of the K histogram, for example, on the ratio to all pixels of the pixels which have density levels at which the cumulative number of pixels becomes 90.0 to 99.0% of all pixels.

Further, in the above embodiments, the first image processing device 61 is provided with the color density gradation converting device 100, the color saturation converting device 101, the digital magnification converting device 102 and the frequency processing device 103 and the dynamic range converting device 104. However, it not necessary for the first image processing device 61 to be equipped with all of these processing devices. On the other hand, first image processing device 61 is not limited to these processing device and can additionally be provided with other image processing device. Moreover, if magnification conversion is carried out before frequency processing, the order of the image processing by the other processing devices can be change as desired.

Further, in the above embodiments, the transmission type image read-out apparatus 10 uses the CCD line sensor 35 to conduct color image read-out. However, a CCD area sensor can be used instead of the CCD line sensor 35.

Further, in the above embodiments, the color image is reproduced on the color photographic paper 90. Instead, however, the image can be reproduced only on the CRT 68 and not be reproduced on the color photographic paper 90.

Further, in the present invention, the respective devices need not necessarily be physical devices and arrangements whereby the functions of the respective devices are accomplished by software fall within the scope of the present invention. In addition, the function of a single device may be accomplished by two or more physical devices and the functions of two or more devices may be accomplished by a single physical device.

This invention provides an improved image processing apparatus for a color image reproducing system which photoelectrically reads out a color image, converts the read-out color image into a digital signal, stores the so-obtained digital image data in image data memory, carries out image processing on the image data stored in the image data memory and reproduces the color image. Specifically it refers to an image processing apparatus for such a color image reproducing system which enables image data obtained by reading a color image recorded on reversal film to be automatically subjected to desired gradation processing in accordance with the gradation of the color image. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An image processing apparatus for a color image reproducing system which photoelectrically reads out a color image, converts the read-out color image into digital image data, stores the digital image data in an image data memory, carries out image processing on the stored image data and reproduces the color image, the image processing apparatus comprising:

K histogram calculating device for calculating a histogram of a density of the color image, after conversion to a monochrome image;

first reference density level calculating device for calculating a first reference density level, corresponding to a density of white regions of the color image;

second reference density level calculating device for calculating a second reference density level, corresponding to the density of white regions of the color image and being relatively higher than the first reference density level;

third reference density level calculating means for calculating a third reference density level corresponding to the density of black regions of the color image;

fourth reference density level calculating device for calculating, based on the second reference density level and the third reference density level, a fourth reference density level corresponding to an intermediate density of the color image;

density level conversion value calculating device for calculating, based on the histogram calculated by the K histogram calculating device, the ratio of image data having a density level corresponding to the density of black regions of the color image to all image data of the color image and for calculating, based on the calculated ratio and the third reference density level, a third reference density level conversion value and a fourth reference density level conversion value; and gradation conversion executing device for converting a gradation of the color image, based on the third and fourth reference density level conversion values calculated by the density level conversion value calculating means and predefined first reference density level and second reference density level conversion values.

2. An image processing apparatus according to claim 1, wherein the density level conversion value calculating means calculates, based on the histogram calculated by the K histogram calculating means, a ratio of pixels having the third reference density level calculated by the third reference density level calculating device to all pixels of the color image and calculates, based on the calculated ratio and the third reference density level, the third reference density level conversion value and the fourth reference density level conversion value.

3. An image processing apparatus according to claim 2, further comprising:

R density histogram calculating means for calculating an R density histogram corresponding to an R density of the color image;

G density histogram calculating means for calculating a G density histogram corresponding to a G density of the color image; and B density histogram calculating means for calculating a B density histogram corresponding to a B density of the color image, wherein the first reference density level calculating means, the second reference density level calculating means and the third reference density level calculating means respectively calculate, based on the histogram calculated by the K histogram calculating means, monochrome density levels at which the numbers of pixels become $x\%$, $y\%$ and $z\%$ of all pixels; respectively calculate, based on the R density histogram, the G density histogram and the B density histogram, the corresponding R density level, G density level and B density level; correct the monochrome density levels in accordance with an absolute value of differences between the first reference density level, the second reference density level and the third reference density level and each of the corresponding R density level, G density level and B density level; and respectively calculate the first reference density level, the second reference density level and the third reference density level.

4. An image processing apparatus according to claim 1, further comprising:

R density histogram calculating means for calculating an R density histogram corresponding to an R density of the color image;

G density histogram calculating means for calculating a G density histogram corresponding to a G density of the color image; and B density histogram calculating means for calculating a B density histogram corresponding to a B density of the color image, wherein the first reference density level calculating means, the second reference density level calculating means and the third reference density level calculating means respectively calculate, based on the histogram calculated by the K histogram calculating means, monochrome density levels at which the numbers of pixels become $x\%$, $y\%$, and $z\%$ of all pixels; respectively calculate, based on the R density histogram, the G density histogram and the B density histogram, the corresponding R density level, G density level and B density level; correct the monochrome density levels in accordance with an absolute value of differences between the first reference density level, the second reference density level and the third reference density level and each of the corresponding R density level, G density level and B density level; and respectively calculate the first reference density level, the second reference density level and the third reference density level.

5. An image processing apparatus for a color image reproducing system which photoelectrically reads out a color image, converts the read-out color image into digital image data, stores the digital image data in an image data memory, carries out image processing on the stored image data and reproduces the color image, the image processing apparatus comprising:

K histogram calculating means for calculating a histogram of a density of the color image, after conversion to a monochrome image;

R density histogram calculating means for calculating an R density histogram corresponding to an R density of the color image;

G density histogram calculating means for calculating a G density histogram corresponding to a G density of the color image;

B density histogram calculating means for calculating a B density histogram corresponding to a B density of the color image;

first reference density level calculating means for calculating a first reference density level, corresponding to a density of white regions of the color image;

second reference density level calculating means for calculating a second reference density level, corresponding to a density of white regions of the color image and being relatively higher than the first reference density level;

third reference density level calculating means for calculating a third reference density level corresponding to the density of black regions of the color image;

fourth reference density level calculating means for calculating, based on the second reference density level and the third reference density level, a fourth reference density level corresponding to an intermediate density of the color image;

first region determining device for determining first regions as having a density level at or below a first prescribed density level, relatively higher than the first reference density level, and having a color saturation level at or below a first prescribed color saturation level;

second region determining device for determining second regions as having a density level at or above a second prescribed density level, relatively lower than the second reference density level, and at or below a third prescribed density level, relatively higher than the second reference density level, and having a color saturation level at or below a second prescribed color saturation level;

third region determining device for determining third regions as having a density level at or above a fourth prescribed density level, relatively lower than the third reference density level, and having a color saturation level below a third prescribed color saturation level;

density level conversion value calculating means for conducting calculations, based on an average value of ratios of the R, G, B density level components corresponding to the density level of pixels in the first region determined by the first region determining device and the first reference density level calculated by the first reference density level calculating means, to determine individual reference values for the R, G, B density level components of the first reference density level, for conducting calculations, based on an average value of ratios of the R, G, B density level components corresponding to the density level of pixels in the second regions determined by the second region determining device and the second reference density level calculated by the second reference density level calculating device, to determine individual reference values for the R, G, B density level components of the second reference density level, for conducting calculations based on an average value of ratios of the R, G, B density level components corresponding to the density level of pixels in third regions determined by the third region determining means and the third reference density level calculated by third reference density level calculating means to determine individual reference values for the R, G, B density level components of the third reference density level and for conducting calculations, based on the individual reference values for the R, G, B density level components of the second reference density level and the individual reference values for the R, G, B density level components of the third reference density level, to determine individual reference values for the R, G, B density level components of the fourth reference density level, and density gradation conversion executing device for converting a gradation of the color image, based on the third and fourth reference density level conversion values calculated by the density level conversion value calculating means.

* * * * *